(12) United States Patent
Jarecki et al.

(10) Patent No.: US 12,374,123 B2
(45) Date of Patent: Jul. 29, 2025

(54) ENHANCED VEHICLE NAVIGATION USING NON-DESTRUCTIVE INSPECTION ONE-DIMENSIONAL SENSOR ARRAYS

(71) Applicant: The Boeing Company, Arlington, VA (US)

(72) Inventors: Walter J. Jarecki, Chino Hills, CA (US); Gregory J. Sweers, Renton, WA (US); Gary E. Georgeson, Tacoma, WA (US); James J. Troy, Issaquah, WA (US); Phillip R. Riste, Everett, WA (US); Armando X. Membrila, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/601,595

(22) Filed: Mar. 11, 2024

(65) Prior Publication Data

US 2024/0221385 A1   Jul. 4, 2024

Related U.S. Application Data

(63) Continuation of application No. 17/469,167, filed on Sep. 8, 2021, now Pat. No. 11,961,305.

(51) Int. Cl.
*G06V 20/56* (2022.01)
*B64C 39/02* (2023.01)
(Continued)

(52) U.S. Cl.
CPC .......... *G06V 20/56* (2022.01); *B64C 39/024* (2013.01); *G06F 18/2113* (2023.01);
(Continued)

(58) Field of Classification Search
CPC ........ G06V 20/56; G06V 20/17; G06V 20/64; G06F 18/2113; B64C 39/024; B64U 2101/30
See application file for complete search history.

(56) References Cited

U.S. PATENT DOCUMENTS 6,636,581 B2 * 10/2003 Sorenson .............. G01N 23/04
378/58
7,609,875 B2 * 10/2009 Liu ...................... G01B 11/24
359/287

(Continued)

FOREIGN PATENT DOCUMENTS

EP          3798677 A1 *  3/2021  ............ G01D 5/00

*Primary Examiner* — Manav Seth
(74) *Attorney, Agent, or Firm* — Joseph M. Butscher; The Small Patent Law Group LLC

(57) ABSTRACT

Systems and methods for tracking the location of a non-destructive inspection (NDI) scanner using scan data converted into images of a target object. Scan images are formed by aggregating successive scan strips acquired using one or two one-dimensional sensor arrays. An image processor computes a change in location of the NDI scanner relative to a previous location based on the respective positions of common features in partially overlapping scan images. The performance of the NDI scanner tracking system is enhanced by: (1) using depth and intensity filtering of the scan image data to differentiate features for improved landmark identification during real-time motion control; and (2) applying a loop-closure technique using scan image data to correct for drift in computed location. The enhancements are used to improve localization, which enables better motion control and coordinate accuracy for NDI scan data.

21 Claims, 18 Drawing Sheets

(51) Int. Cl.
*G06F 18/2113* (2023.01)
*G06V 20/17* (2022.01)
*G06V 20/64* (2022.01)
*B64U 101/30* (2023.01)

(52) U.S. Cl.
CPC ............ *G06V 20/17* (2022.01); *G06V 20/64* (2022.01); *B64U 2101/30* (2023.01)

(56) References Cited

U.S. PATENT DOCUMENTS

| | | | |
|---|---|---|---|
| 8,199,194 B2* | 6/2012 | Troy | G01S 5/163 |
| | | | 348/94 |
| 10,533,840 B2* | 1/2020 | Woodard, Jr. | G06T 17/20 |
| 11,275,391 B2* | 3/2022 | Georgeson | B64U 30/20 |
| 11,367,201 B2* | 6/2022 | Troy | G01S 15/8915 |
| 11,635,408 B2* | 4/2023 | Hafenrichter | G01N 29/0645 |
| | | | 382/199 |
| 11,692,812 B2* | 7/2023 | Döring | G01B 11/005 |
| | | | 382/154 |
| 11,868,676 B2* | 1/2024 | Boyd | G06F 3/165 |
| 11,961,305 B2* | 4/2024 | Jarecki | B64F 5/60 |
| 2004/0246473 A1* | 12/2004 | Hermary | G01N 33/46 |
| | | | 356/237.1 |
| 2010/0155156 A1* | 6/2010 | Finkelstein | B25J 19/021 |
| | | | 901/1 |
| 2015/0130928 A1* | 5/2015 | Maynard | H04N 7/18 |
| | | | 348/135 |
| 2021/0090269 A1* | 3/2021 | Troy | G01N 29/265 |
| 2023/0186489 A1* | 6/2023 | Troy | G01S 15/8945 |
| | | | 702/150 |

* cited by examiner

ENHANCED VEHICLE NAVIGATION USING NON-DESTRUCTIVE INSPECTION ONE-DIMENSIONAL SENSOR ARRAYS

RELATED PATENT APPLICATION

This application is a continuation of and claims priority from U.S. patent application Ser. No. 17/469,167 filed on Sep. 8, 2021.

BACKGROUND

This disclosure generally relates to systems and methods for tracking the location of a scanner as it moves over a target area (e.g., a surface of a target object). In particular, this disclosure relates to systems and methods for tracking the location of a non-destructive inspection scanner (hereinafter "NDI scanner").

Some existing solutions for inspecting a structure include robotic motion platforms (e.g., robotic crawler vehicles and unmanned aerial vehicles (UAVs)) having a frame that supports a non-destructive inspection (NDI) scanner. The frame may be moved over the outer mold line of a structure. In alternative embodiments, the NDI scanner may be mounted on a distal end of a manipulator arm or on a mobile robot.

Various types of imagers may be mounted to a motion platform and utilized to perform NDI on target objects. One or more imagers may move over the portion of the structure to be examined, and acquire scan image data representing characteristics or features (e.g., boundaries of objects or surfaces) of the structure. For example, a pulse-echo, thru-transmission, or shear wave sensor may be utilized to obtain ultrasonic data, such as thickness gauging, detection of laminar defects and porosity, and/or crack detection in the structure. Resonance, pitch/catch or mechanical impedance sensors may be utilized to provide indications of voids or porosity, such as in adhesive bondlines of the structure. In addition, single and dual eddy current sensors impart and detect eddy currents within a structure to provide sensor data for detecting cracks and/or corrosion, particularly in metallic and other conductive structures.

Effective use of such NDI scanner-equipped motion platforms often depends on their accurate localization in the environment within which they move. As used herein, the term "localization" means determination of the location of a motion platform in a local frame of reference (e.g., the coordinate system of an airplane in accordance with three-dimensional coordinates stored in a non-transitory tangible computer-readable storage medium). As used herein, the term "location" includes position in a coordinate system and orientation relative to that coordinate system. On the one hand, if the NDI scanner is fixed relative to the motion platform, then determining the location of the NDI scanner enables the location of the motion platform to be determined. On the other hand, if the NDI scanner is movable relative to the motion platform, then determining the location of the NDI scanner and the displacement of the NDI scanner relative to the motion platform enables the location of the motion platform to be determined.

Manual NDI requires time-consuming access to conduct manual inspection of structure and is labor intensive. In the specific case of vehicle inspection, the vehicle is out of service during the significant amount of time needed to coordinate and complete the inspection. In addition, access via equipment lifts may cause damage to the structure. Manual NDI is also encumbered by human safety and ergonomic issues.

In particular, inspections of chemically milled structures and lap-spliced panels of an aircraft are difficult tasks for the following reasons: (a) typically the areas on the aircraft to be inspected are large; (b) the detection instrumentation needs to be adjusted to account for paint and material thickness changes; (c) lift and access equipment are needed; and (d) the structural features are hidden. If the inspection occurs at a remote airport or in a military field situation, the proper equipment for access to the area to be inspected is usually not readily available.

SUMMARY

The subject matter disclosed herein is directed to systems and methods for tracking the location of an NDI scanner using images of a target object acquired by the NDI scanner. The target object has features representing geometric elements, such as object boundaries (discontinuity in depth and/or material type) and surface boundaries (hereinafter "structural features"). Scan images are formed by aggregating successive scan strips acquired using one or two one-dimensional (1-D) sensor arrays (for example, linear sensor arrays). An image processor (or image processing application) constructs and then compares successive partially overlapping scan images that include common feature points corresponding to respective structural features of the target object. The image processor is further configured to compute a change in location of the NDI scanner relative to a previous location based on the respective positions of those common feature points in the partially overlapping scan images. This relative physical distance is then added to the previous (old) absolute location estimate to obtain the current (new) estimated absolute location of the NDI scanner.

As used herein, the term "sensor data" means analog data acquired by a sensor array, which may be part of an NDI scanner that additionally includes a digital signal processor. As used herein, the term "scan image data" means digital data in the form of a 2-D matrix of pixel values (hereinafter "pixels") derived from sensor data. For example, a one-dimensional (linear) sensor array (hereinafter "1-D sensor array") may be scanned over a surface to acquire respective analog sensor data which is converted to a corresponding 2-D matrix of pixels representing an image (hereinafter "scan image") of the subsurface structure of the scanned portion of a target object.

In accordance with various embodiments disclosed herein, scan images are formed by aggregating successive scan strips acquired using one or two 1-D sensor arrays. An image processor constructs and then compares successive partially overlapping scan images that include common feature points corresponding to respective structural features of the target object. The image processor is further configured to compute a change in location of the NDI scanner relative to a previous location based on the respective positions of those common feature points in the partially overlapping scan images. This relative physical distance is then added to the previous (old) absolute location estimate to obtain the current (new) absolute location estimate of the NDI scanner.

In accordance with the improvements to the above-described process disclosed herein, the performance of the NDI scanner tracking system is enhanced by: (1) using depth and intensity filtering of the scan image data to differentiate features for improved landmark identification during real-time motion control; and (2) applying a loop-closure technique using scan image data to correct for drift in computed location.

In accordance with the first enhancement, the time-of-arrival of the reflected signal (which parameter is proportional to reflector depth) and the intensity range within the scan image data (i.e., different features at different depths, or equivalently, different colors of the resulting processed images) are used to advantage. By using depth and intensity information, the process can filter on different types of features, which can then be used for different aspects of motion control. For example, if specific features were detectable in different layers of an assembly, different types of actions could be taken when those features are encountered (detected). This is a type of landmark-based motion planning, but relies on the type of sensor data acquired.

In accordance with the second enhancement, known path (location) information is used to correct for drift in the computed location. As the system collects sensor data, derives scan image data, and computes the motion platform location, small distance measurement error buildup that reduces the accuracy of the location estimate may occur. By taking advantage of known locations in the computation of the location estimate, such as the starting and ending locations, a better estimate of motion platform location can be obtained and then used for alignment of the scan image data to obtain an improved (i.e., more accurately located) representation of the scanned environment. In accordance with one proposed implementation, the motion platform starts and ends at the same location when inspecting a region. This type of closed path has advantages for motion control. A technique called "loop closure" takes advantage of the fact that the starting and ending positions are the same and can be used to correct the data in the recorded path to more accurately estimate the location of the motion platform as it moves along a path.

This disclosure describes motion platform navigation control techniques that use the scan image data (derived from sensor data acquired by 1-D sensor arrays) in real time to enhance the localization process by providing more refined position control. More specifically, the disclosed techniques improve the accuracy of the captured localization information (scan image data), which localization information is used to control navigation of the motion platform and provide coordinates of features within the scan data. The NDI sensors augment the motion control system of the motion platform by providing sensor data that is processed to determine location and direction of motion. In addition, a detailed process sequence and implementation techniques for incorporating these method enhancements into an NDI inspection process will be described.

Although various embodiments of systems and methods for tracking the location of an NDI scanner using scan images acquired from the target object are described in some detail below, one or more of those embodiments may be characterized by one or more of the following aspects.

One aspect of the subject matter disclosed in detail below is a method for tracking a location of a scanner having a one-dimensional sensor array in a frame of reference of a target object, the method comprising: (a) setting filter threshold values for depth and intensity which are associated with a specific type of feature; (b) moving the scanner across a surface of a target object from a starting location to an ending location along a path; (c) acquiring successive sets of sensor data at a known capture rate as the scanner moves along the path during step (b); (d) converting the successive sets of sensor data to respective scan strips of scan image data; (e) constructing successive scan images from respective sequences of scan strips converted from sensor data acquired as the scanner moves along the path during step (b); (f) filtering the successive scan images using the filter threshold values to isolate the feature of the specific type, wherein the path along which the scanner moves during step (b) is adjusted based on results of the filtering; (g) finding feature points in respective pairs of successive scan images; (h) determining which feature points found in step (g) are common feature points in the respective pairs of successive scan images; (i) computing pixel position differences between respective positions of common feature points in the respective pairs of successive scan images; (j) computing respective scanner displacements by multiplying the respective pixel position differences computed in step (i) by a scaling factor representing a distance traveled by the scanner per scan strip; and (k) computing coordinates of successive positions of points on respective portions of the surface of the target object corresponding to the successive scan images based on the respective scanner displacements.

In accordance with some embodiments, the method described in the immediately preceding paragraph further comprises: (l) comparing respective scan images corresponding to the start and ending locations of the scanner; (m) determining a location offset of the ending location from the starting location; (n) computing corrected coordinates of successive positions of points on the respective portions of the surface of the target object corresponding to successive scan images based on the location offset; (o) associating the corrected coordinates with the successive scan images; (p) computing corrected angles of successive orientations of the respective portions of the surface of the target object corresponding to the successive scan images based on the location offset; (q) associating the corrected angles with the successive scan images; and (r) storing the associated corrected coordinates and associated corrected orientations with the successive scan images in a non-transitory tangible computer-readable storage medium.

Another aspect of the subject matter disclosed in detail below is a method for tracking a location of a motion platform carrying first and second scanners that respectively comprise first and second one-dimensional sensor arrays which have respective mutually parallel centerlines separated by a fixed distance. The method comprises: (a) setting filter threshold values for depth and intensity which are associated with a specific type of feature; (b) moving the first scanner across a surface of a target object from a starting location to an ending location along a path; (c) operating the first scanner to acquire a first sequence of sets of sensor data at a known capture rate as the first scanner moves along the path; (d) operating the second scanner to acquire a second sequence of sets of sensor data at the known capture rate as the first scanner moves along the path; (e) converting the first sequence of sets of sensor data to a corresponding first sequence of scan strips of scan image data; (f) converting the second sequence of sets of sensor data to a corresponding second sequence of scan strips of scan image data, wherein a number of scan strips in the second sequence of scan strips is the same as a number of scan strips in the first sequence of scan strips; (g) constructing successive first scan images from the first sequence of scan strips; (h) constructing successive second scan images from the second sequence of scan strips; (i) filtering the first and second scan images using the filter threshold values to isolate the feature of the specific type, wherein the path along which the first scanner moves during step (b) is adjusted based on results of the filtering; (j) finding feature points in the first and second scan images; (k) determining which feature points found in step (j) are common feature points in the first and second scan images; (l) computing a pixel position difference between the respective positions of a common feature point in the first and second scan images; and (m) computing a scanner displacement by multiplying the pixel position difference computed in step (l) by a scaling factor representing a distance traveled by the first scanner per scan strip.

A further aspect of the subject matter disclosed in detail below is a system comprising: a motorized motion platform comprising a frame; a scanner comprising a one-dimensional sensor array supported by the frame; and a computer system communicatively coupled to receive sensor data from the one-dimensional sensor array and send control signals for controlling movement of the motorized motion platform. The computer system is configured to perform operations comprising: (a) controlling the motorized motion platform to move the scanner across a surface of a target object from a starting location to an ending location along a path; (b) acquiring successive sets of sensor data at a known capture rate as the scanner moves along the path during operation (a); (c) converting the successive sets of sensor data to respective scan strips of scan image data; (d) constructing successive scan images from respective sequences of scan strips converted from sensor data acquired as the scanner moves along the path during operation (a); (e) filtering the successive scan images to isolate a feature of a specific type using filter threshold values for depth and intensity which are associated with the feature, wherein the path along which the scanner moves during operation (a) is adjusted based on results of the filtering; (f) finding feature points in respective pairs of successive scan images; (g) determining which feature points found in operation (f) are common feature points in the respective pairs of successive scan images; (h) computing pixel position differences between respective positions of common feature points in the respective pairs of successive scan images; (i) computing respective scanner displacements by multiplying the respective pixel position differences computed in operation (h) by a scaling factor representing a distance traveled by the scanner per scan strip; and (j) computing coordinates of successive positions of points on respective portions of the surface of the target object corresponding to the successive scan images based on the respective scanner displacements. In accordance with some embodiments, the motorized motion platform is configured to enable holonomic motion. (As used in this disclosure, a vehicle or device is considered to be holonomic if the controllable degrees of freedom are equal to the total degrees of freedom.) In accordance with other embodiments, the motorized motion platform comprises a frame and a turret rotatably coupled to the frame, and the scanner is affixed to the turret.

Yet another aspect of the subject matter disclosed in detail below is a method for tracking a location of a scanner having a one-dimensional sensor array in a frame of reference of a target object, the method comprising: (a) moving the scanner across a surface of a target object from a starting location to an ending location along a path; (b) acquiring successive sets of sensor data at a known capture rate as the scanner moves along the path during step (a); (c) converting the successive sets of sensor data to respective scan strips of scan image data; (d) constructing successive scan images from respective sequences of scan strips converted from sensor data acquired as the scanner moves along the path during step (a); (e) finding feature points in respective pairs of successive scan images; (f) determining which feature points found in step (e) are common feature points in the respective pairs of successive scan images; (g) computing pixel position differences between respective positions of common feature points in the respective pairs of successive scan images; (h) computing respective scanner displacements by multiplying the respective pixel position differences computed in step (g) by a scaling factor representing a distance traveled by the scanner per scan strip; (i) computing coordinates of successive positions of points on respective portions of the surface of the target object corresponding to the successive scan images based on the respective scanner displacements. (j) comparing respective scan images corresponding to the start and ending locations of the scanner; (k) determining a location offset of the ending location from the starting location; (l) computing corrected coordinates of successive positions of points on the respective portions of the surface of the target object corresponding to successive scan images based on the location offset; (m) associating the corrected coordinates with the successive scan images; (n) computing corrected angles of successive orientations of the respective portions of the surface of the target object corresponding to the successive scan images based on the location offset; (o) associating the corrected angles with the successive scan images; and (p) storing the successive scan images and associated corrected coordinates and corrected angles in a non-transitory tangible computer-readable storage medium.

Other aspects of systems and methods for tracking the location of an NDI scanner using scan images of the target object are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
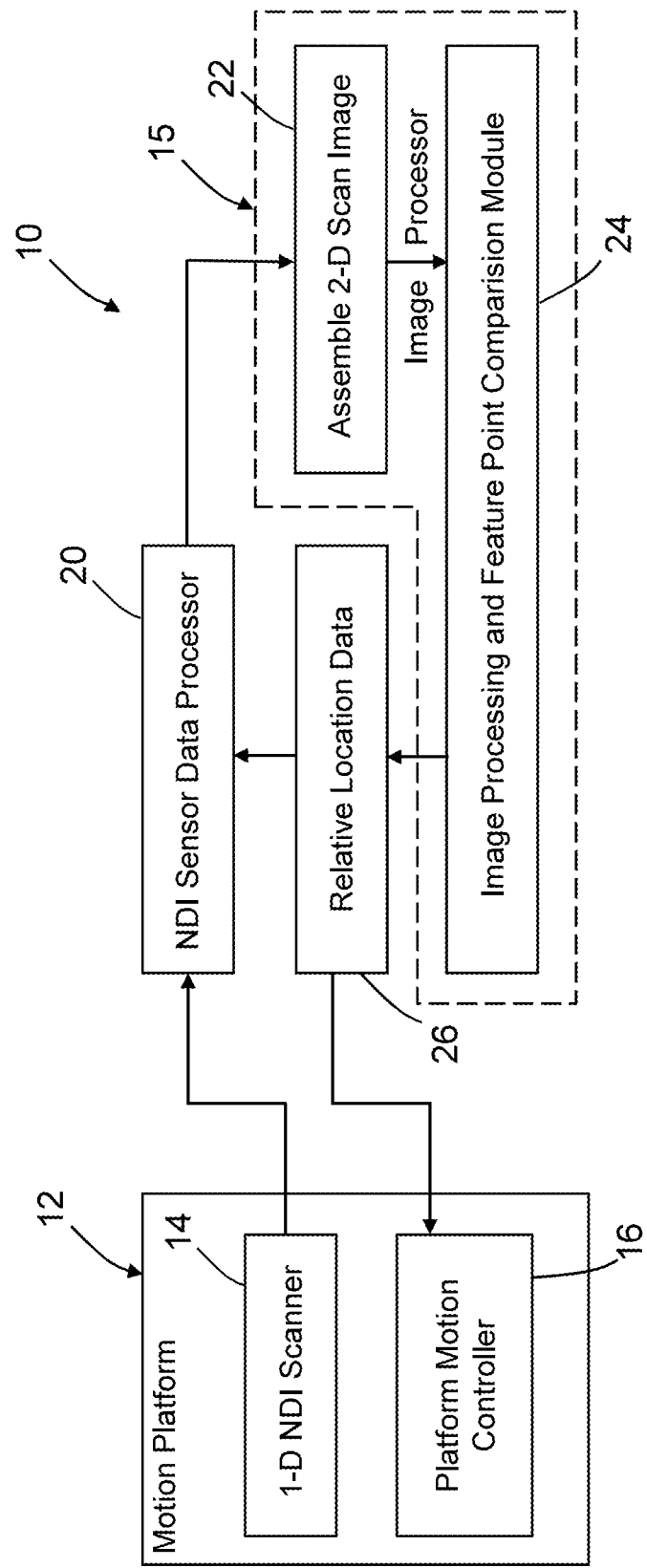
FIG. 1 is a block diagram identifying some components of a system for tracking the location of an NDI scanner which is mounted to a motorized motion platform and comprises a 1-D array of sensors (1-D sensor array) in accordance with one embodiment.

For the purpose of illustration, systems and methods for tracking the location of an NDI scanner using scan images of the target object will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Given by way of non-limiting example for illustration purposes only, the target object may be an aircraft part, such as a barrel-shaped section of an aircraft fuselage. It should be appreciated, however, that the systems and methods described hereinafter with reference to a fuselage section may also be applied to other types of workpieces which are part of some other type of vehicle or structure.

Moreover, the workpiece may be made of any material as desired for a particular application. It will be appreciated that the type of material used for the workpiece may, in part, determine which type of non-destructive inspection technique is used to inspect the workpiece. Given by way of non-limiting examples, the workpiece may be made of composite material, such as a composite laminate made of fiber-reinforced plastic, or a metal, such as aluminum or titanium. The disclosed examples of materials are described for the purpose of illustration only and not to limit the scope of the claims appended hereto.

Depending on the type of material being inspected, any one of a multiplicity of types of NDI sensors can be utilized. The method proposed herein may be applied to any 1-D NDI imager, including imagers in which a 1-D array of sensors (such as ultrasonic transducers or eddy current coils) are in contact with or in proximity to the surface being inspected. In alternative embodiments, an infrared thermography flash system, a terahertz camera, a microwave imager, or a laser Doppler vibrometry system could produce non-contact 2-D images that are digitized/pixelized in the X-Y format and can be overlapped, aligned, and used for tracking purposes.

In the context of the specific application of inspecting fuselage sections, the scanning system may comprise means for scanning the skin of the fuselage section from a vantage point external to the fuselage section. In the embodiments disclosed below, the scanning means is an NDI scanner in the form of a 1-D sensor array that collects sensor data from a confronting portion of the fuselage section. In one proposed implementation, the NDI scanner scans the outer mold line of the fuselage section in a raster (e.g., serpentine) scan pattern.

As used herein, the terms "X axis" and "Y axis" refer to respective axes which intersect at right angles at an origin on a surface of a target object (thus forming a frame of reference of the target object) and which follow the contour of the surface as the axes extend away from the origin. In cases wherein the surface is planar (flat), the X and Y axes are straight, co-planar and mutually perpendicular. In cases wherein the surface is curved in the Y direction and straight in the X direction, the Y axis is locally tangent to the surface. In cases wherein the surface is curved in both the X and Y directions, the X and Y axes are both locally tangent to the surface. In each case, the Y position coordinate of a point on the surface is measured along the Y axis and equal to a first distance from the origin, while the X position coordinate of the point on the surface is measured along the X axis and equal to a second distance from the origin. On the one hand, if the axis is straight, then the position coordinate is equal to the distance of the point from the origin; on the other hand, if the axis is arc-shaped (because the surface of the target object is curved), then the position coordinate is equal to the arc length (not the chord length) from the origin.

The systems and methods described in some detail below enable localization that tracks the location of an NDI scanner using images of the target object. Scan images are formed by aggregating successive scan strips acquired using one or two 1-D sensor arrays. An image processor constructs and then compares successive partially overlapping scan images that include common features corresponding to respective structural features of the target object. The image processor is further configured to compute a change in location of the NDI scanner relative to a previous location based on the respective positions of those common feature points in the partially overlapping scan images. This relative physical distance is then added to the previous (old) absolute location estimate to obtain the current (new) absolute location of the NDI scanner.

As used herein, the term "feature point" means a point of a feature that appears in a scan image. For example, a feature point may be the centroid of the feature. As used herein, the term "common feature" means a feature that appears in two successive scan images. As used herein, the term "common feature point" means a point of a common feature. For example, a common feature point may include a point of a common feature in a first scan image and the same point of the same common feature in a second scan image.

In accordance with some embodiments, the system includes a motorized motion platform comprising a frame, a scanner comprising a 1-D sensor array supported by the frame, and a computer system communicatively coupled to receive sensor data from the 1-D sensor array and send control signals for controlling movement of the motorized motion platform. The 1-D sensor array is oriented generally perpendicular to the direction in which the NDI scanner is moving (translating). In one proposed implementation, the 1-D sensor array is fixedly coupled to the frame and moves only when the motion platform moves. In other proposed implementations, the 1-D sensor array is displaceably (e.g., slidably) coupled to the frame and may be moved relative to the motion platform.

In accordance with other embodiments, the system includes a motion platform (manually movable or motorized) comprising a frame, first and second scanners respectively comprising first and second 1-D sensor arrays having centerlines which are oriented mutually parallel and separated by a fixed distance, and a computer system communicatively coupled to receive sensor data from the first and second 1-D sensor arrays. In this case, the two 1-D sensor arrays are oriented perpendicular to the direction of movement.

In accordance with one embodiment having a single 1-D sensor array, subsurface depth sensor data is repeatedly (recurrently, continually) acquired by and output from the 1-D sensor array as the NDI scanner moves at a known speed on a surface of the target object. The resulting 1-D scan strip sequence is fed to a composite scan image construction module which constructs a composite scan image by aggregating successive scan strips. The resulting composite scan image contains (virtual) features corresponding to structural features in the target object. In addition, the composite scan image construction module periodically assembles sequences of scan strips to form individual two-dimensional scan images (also referred to herein as "frames"), which individual frames are partially overlapping. The image processor further includes an image processing and feature point comparison module that is configured to construct and then compare successive partially overlapping scan images (frames) that include common features corresponding to respective structural features of the target object. The image processing and feature point comparison module is further configured to compute a change in location of the scanner relative to the previous location based on the respective positions of a common feature point in the partially overlapping scan images. More specifically, the number of pixels representing the pixel position difference in the respective positions of the common feature point appearing in the two most recently captured scan images is counted and scaled based on the scan strip capture rate (hereinafter "capture rate") and the motion platform speed and the corresponding relative physical distance traveled in the time interval between sequential scan image captures is computed. This relative physical distance is then added to the prior absolute location estimate to get the new (current) absolute location.

In an alternative embodiment that has two mutually parallel 1-D sensor arrays, subsurface depth sensor data is repeatedly (recurrently, continually) acquired by and output from each 1-D sensor array as the NDI scanner moves on a surface of the target object. The resulting 1-D scan strip sequences are fed to respective composite scan image construction modules which construct respective composite scan images by aggregating successive scan strips. The image processor further includes an image processing and feature point comparison module that constructs respective partially overlapping scan images from the respective 1-D scan strip sequences and then compares those scan images in a search for common features. The image processing and feature point comparison module is further configured to compute a change in location of the scanner relative to the previous location based on the respective positions of the common feature point in the partially overlapping scan images. More specifically, the number of pixels representing the pixel position difference in the respective positions of common features appearing in the two most recently captured scan images is counted. Then a scaling factor is computed by dividing the fixed distance by the imaged position difference. The distance separating the first and third X positions is then computed by multiplying the number of scan strips in the first sequence by the scaling factor. This relative physical distance is then added to the prior absolute location estimate to get the new (current) absolute location.

The enhanced NDI-based navigation method described herein uses depth and intensity filtering of the scan image data as well as a loop-closure method to improve accuracy. Computer processing of depth and intensity information contained in scan image data enables an enhanced ability to find navigation landmarks. The loop-closure method is employed with input from the NDI sensor. The NDI sensor will provide feedback control to the loop-closure algorithm by monitoring changes in the structural configuration. The feedback provided to the loop-closure algorithm will allow the motion platform to know where to start and end and also allow for corrections in path (drift). In addition, this disclosure describes the incorporation of these enhancements into a production process. It also describes additional hardware implementation techniques.

The motion platform will carry an inspection detection device, a guidance system for dynamic local 3-D maneuvering, a user interface for monitoring and human intervention, and an optional marking device for marking areas which did not pass inspection and may require subsequent maintenance or repair measures.

The dynamic local 3-D maneuvering of the motion platform will utilize features of the airplane, such as skin edges and series-connected edges that form a closed loop (e.g., chemically milled pockets), to guide the motion platform. It may utilize the inspection electromagnetic physics or be supplemented with additional electromagnetic position sensor(s) to complete the required inspection. Dynamic maneuvering will allow the motion platform to be nimble when encountering variations in the aircraft configuration.

The systems proposed herein utilize 3-D localization concepts for navigation and control of a motion platform relative to the initial starting point on the aircraft. Accurate location tracking for UAV-based inspection will enable the system to move to the proper location as well as maintain desired velocities. The localization process provides the information necessary to record the 3-D location of the inspection activity.

In accordance with some embodiments, the enhanced motion platform uses instrument and sensor feedback to enable structural health or defect detection and monitoring. Data from the NDI scanner will be recorded to enable the growth of the defect indication to be monitored. Individual aircraft defect indication monitoring will be possible with the data collected, allowing a tailored maintenance inspection plan that will maximize aircraft usage or a revisit to a select population of defect indications at a later period of time. The enhanced motion platform will apply external markings/labels to the structure to note the area of the further damage investigation.

FIG. 1 is a block diagram identifying some components of a system 10 for tracking the location of an NDI scanner 14 comprising a 1-D array of sensors in accordance with one embodiment. In this embodiment, the NDI scanner 14 is mounted on a motion platform 12 that is motorized for automated movement (e.g., a robotic crawler vehicle). The movements of the motion platform 12 are controlled by an onboard platform motion controller 16 so that the NDI scanner 14 follows a pre-planned scan path on the target object. For example, the NDI scanner 14 may be scanned across the surface of the target object as the motion platform 12 translates along an X axis (of the target object frame of reference). During such translation, the NDI scanner 14 may be continually activated to scan the surface of the target object and acquire sensor data containing information regarding structural features of the target object.

In accordance with some embodiments, the NDI scanner 14 is rigid, so the 1-D sensor array would not directly conform to the surface of the target object, but in most situations the NDI scanner 14 would be mounted in a manner that allows the 1-D sensor array to align generally with the confronting portion of the target object surface. Also, if the sensors are ultrasonic transducers, an acoustic couplant may be used between the sensor array and the surface (e.g., water or some type of gel-like substance or dry acoustic couplant elastomeric material). The presence of acoustic couplant provides some ability to compensate for slight curvature mismatch.

The system 10 partly depicted in FIG. 1 further includes an NDI sensor data processor 20 that is communicatively coupled (via cables or wirelessly) to the NDI scanner 14. The NDI sensor data processor 20 is configured to convert sensor data output by the NDI scanner 14 to 1-D scan image data (hereinafter "scan strips"). The resulting scan strip sequence is fed to an image processor 15. More specifically, the sequence of scan strips is fed to a composite scan image construction module 22 which constructs a composite scan image by aggregating successive scan strips. The resulting composite scan image contains (virtual) features corresponding to structural features in the target object. In addition, the composite scan image construction module 22 periodically assembles sequences of scan strips to form individual two-dimensional scan images (also referred to herein as "frames"), which individual frames are partially overlapping. All of the "processors" or modules may be processes (or applications) running on a general-purpose computer.

In addition, the image processor 15 includes an image processing and feature point comparison module 24 which is communicatively coupled to receive 2-D scan images from the composite scan image construction module 22. The image processing and feature point comparison module 24 may be a processor or computer configured (e.g., programmed) to track the location (also referred to herein as "localization") of the NDI scanner 14 relative to the surface of the target object using the 2-D scan image data. The localization algorithm includes a relative motion updating process based on following scanned features from one captured NDI scan image to the next in order to determine motion of the 1-D sensor array. In accordance with one embodiment, the image processing and feature point comparison module 24 is configured to construct and then compare successive partially overlapping scan images (frames) that include common virtual features (hereinafter "features") corresponding to respective structural features of the target object. The image processing and feature point comparison module 24 finds centroids of common features, which are feature points that are common to both images (hereinafter "common feature points") in the partially overlapping scan images using image processing (e.g., edge detection) and saves the pixel positions of those feature points in a non-transitory tangible computer-readable storage medium (e.g., computer memory).

The image processing and feature point comparison module 24 is further configured to compute a change in location of the NDI scanner 14 relative to a previous location based on the respective positions of respective common feature points in the partially overlapping scan images. More specifically, the number of pixels representing the pixel position difference in the respective positions of centroids of common features appearing in the two most recently captured scan images is counted and scaled based on the capture rate and the motion platform speed and the corresponding relative physical distance traveled in the time interval between sequential scan image captures is computed. In one proposed implementation, the image processing and feature point comparison module 24 computes a scaling factor representing a distance traveled by the scanner per scan strip by dividing the known speed by the known capture rate; and then computes a corresponding distance traveled by the motion platform 12 by multiplying a pixel position difference between the respective positions of the common feature point in the first and second scan images by the scaling factor. The pixel position difference is computed by counting a number of pixel columns by which the position of the common feature point in the second scan image is offset from the position of the common feature point in the first scan image. This relative physical distance traveled is then added to the prior absolute location estimate to get the new (current) absolute location. The absolute location estimate is then used by the platform motion controller 16 to control the motion of the motion platform 12 in accordance with the pre-planned scan path. For example, the location tracking method may further comprise: computing successive scanner displacements; computing successive X position coordinates corresponding to successive X positions of the NDI scanner 14 following respective scanner displacements; and stopping translation of the NDI scanner 14 when the X position coordinate of the scanner equals a limit X position coordinate.

Figure 2A:
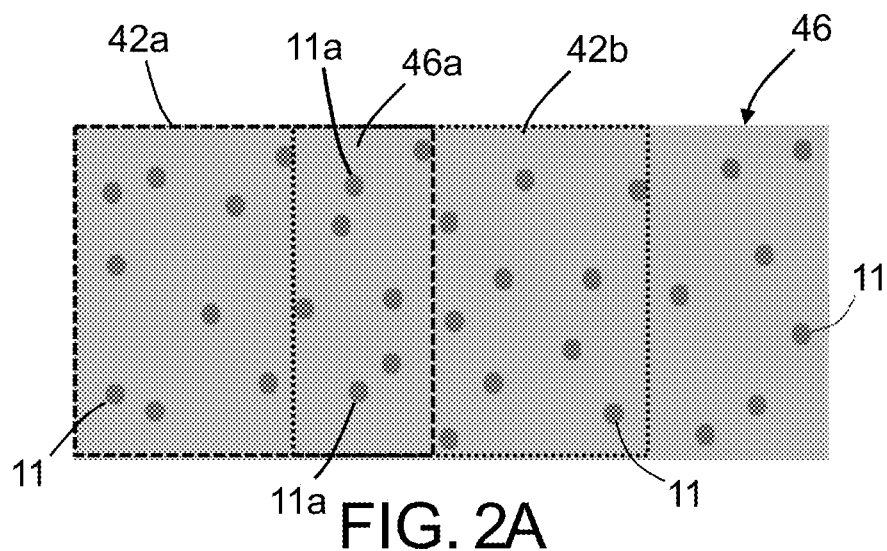
FIG. 2A is a diagram representing a composite scan image formed by aggregating scan image data acquired while scanning a target object having subsurface features using a 1-D sensor array. The dashed and dotted rectangles indicate a pair of partially overlapping scan images.
Figure 2B:
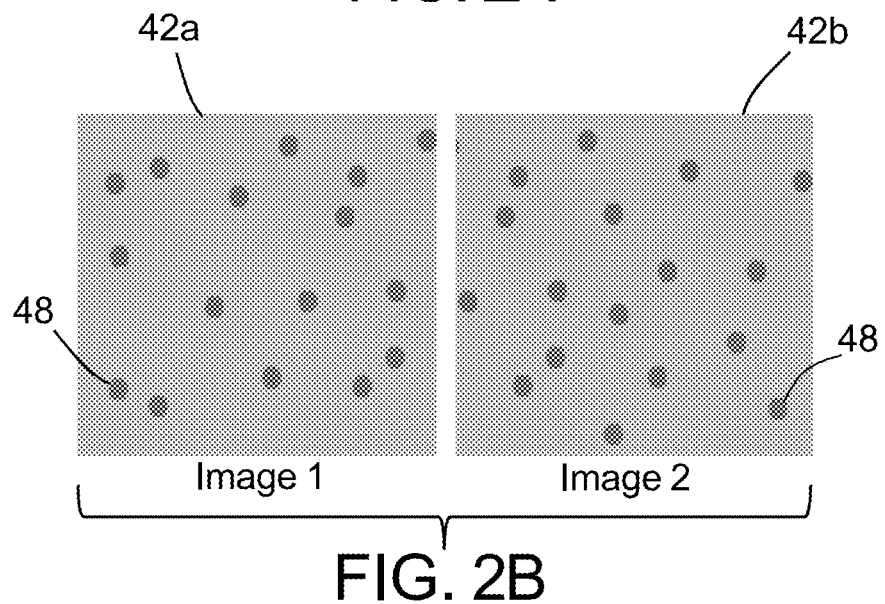
FIG. 2B is a diagram representing a pair of partially overlapping scan images constructed from the sequential scan image data depicted in FIG. 2A.
Figure 2C:
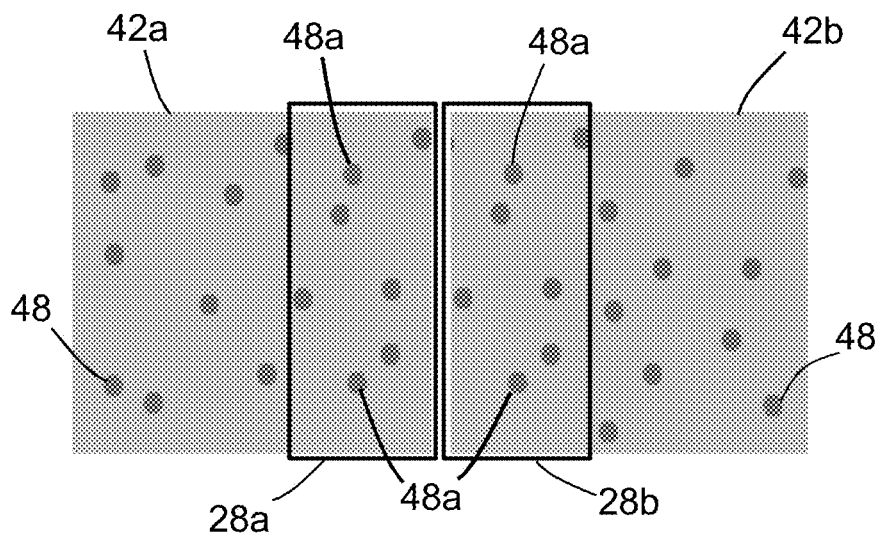
FIG. 2C is a diagram representing sequential scan images containing pixels representing common feature points acquired in the area of partial overlap depicted in FIG. 2A.

FIG. 2A shows a full scan area 46 of a target object having features 11 (represented by dots in this example), which may be structural feature or anomalies detected within the target object being scanned. The dashed and dotted rectangles indicate a pair of partially overlapping scan images 42a and 42b, which are shown in side-by-side relationship in FIG. 2B. As seen in FIG. 2A, scan images 42a and 42b cover a common scan area 46a with common features 11a. Common feature points 48a appear in respective regions 28a and 28b of scan images 42a and 42b, as seen in FIG. 2C. Since regions 28a and 28b of scan images 42a and 42b are images of the same rectangular scan area 46a, regions 28a and 28b will be identical (referred to hereinafter as "overlapping regions of the scan images"). These overlapping regions with common features in sequential (successive) scan images are used to track a subsequent location of the NDI scanner 14 relative to a previous location. In addition, the redundant information in one of the scan images 42a or 42b can be omitted when the scan images 42a and 42b are stitched together to form a composite scan image.

Figure 3:
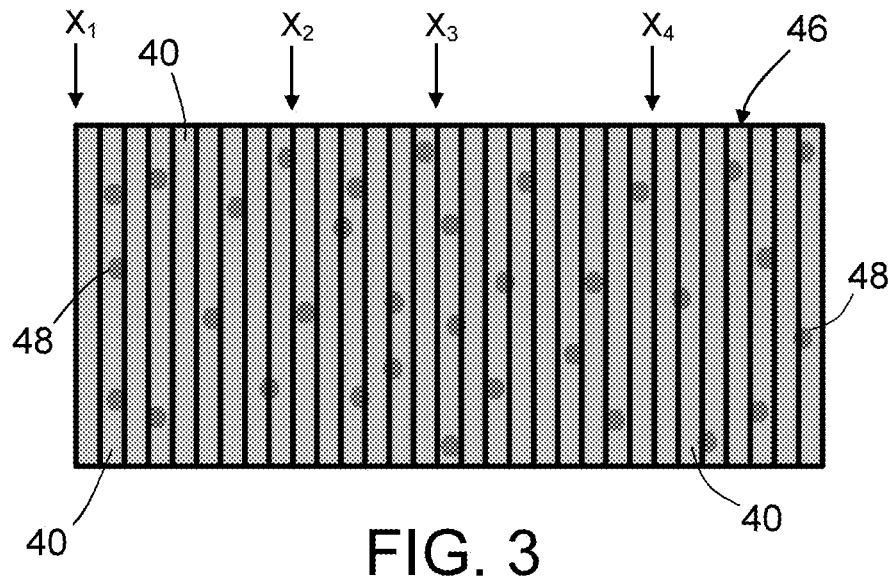
FIG. 3 is a diagram representing a sequence of scan strips converted into respective columns of pixels in a composite scan image.
Figure 4:
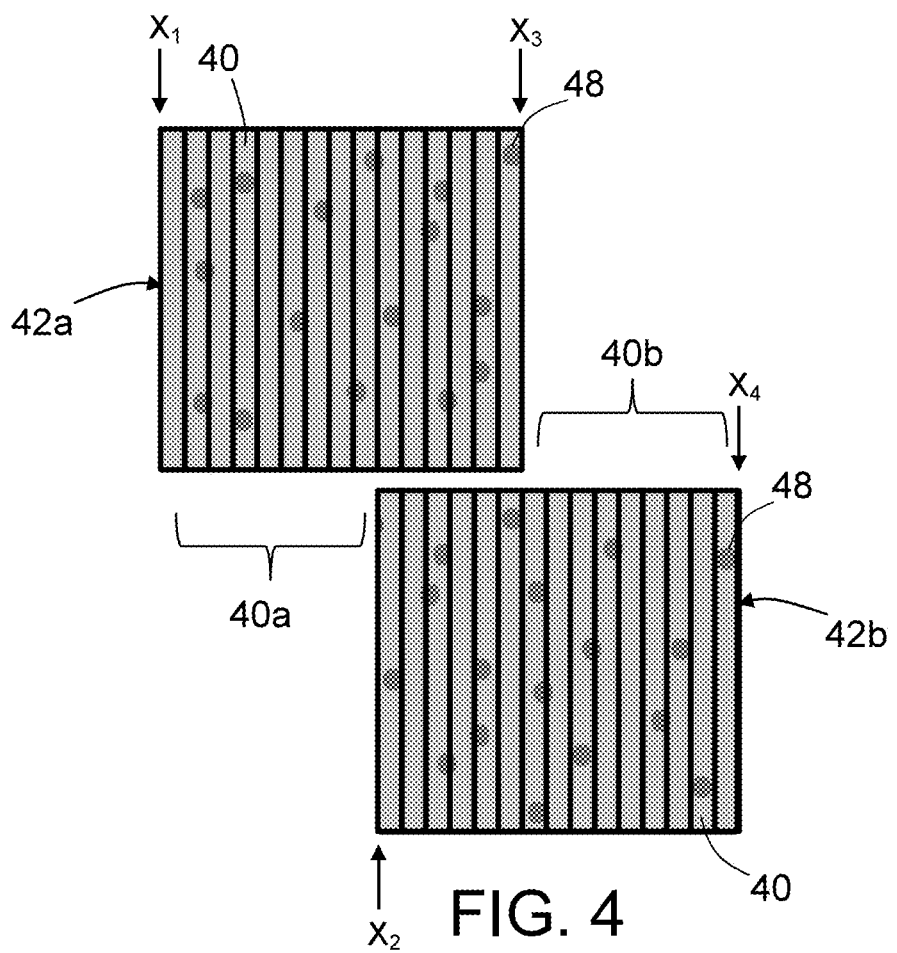
FIG. 4 is a diagram representing a pair of frames containing partially overlapping scan images constructed by removing and adding columns of pixels.

The composite scan image 46 shown in FIG. 2A consists of individual scan strips of scan image data which are acquired in succession during translation of the 1-D sensor array. FIG. 3 is a diagram representing a composite scan image 46 formed by aggregating scan image data acquired while scanning a target object having features 48 (which may be structural features or anomalies in the material) using a 1-D sensor array. A sequence of scan strips 40 is converted into respective columns of pixels to form the composite scan image 46. FIG. 4 is a diagram representing a pair of frames containing partially overlapping scan images 42a and 42b constructed by removing and adding scan strips 40. This diagram assumes that scan image 42a is acquired first. Then old scan strips 40a are removed and new scan strips 40b are added to form the second scan image 42b.

In the example depicted in FIGS. 3 and 4, a scanner having a 1-D sensor array is translated across a surface of a target object in an X direction at a known speed from a first position X1 to second, third and fourth positions X2, X3 and X4 in succession. A first scan image 42a is constructed from a first sequence of scan strips converted from sensor data acquired during movement of the 1-D sensor array from position X1 to position X3; a second scan image 42b is constructed from a second sequence of scan strips converted from sensor data acquired during movement of the 1-D sensor array from position X2 to position X4.

The relative motion updating process proposed herein is based on the concept that partially overlapping sequential scan images will have some features (e.g. representing structural features in the target object) within the pair of images that are common. The assumption here is that the second scan image will have some features in common (hereinafter "common features") with the first scan image. The pixel distance difference between the respective positions of a common feature point is counted and scaled, and then the relative physical distance is added to the prior location estimate to get the new absolute location. In the example depicted in FIG. 4, a distance separating positions X1 and X2 may be computed by multiplying a pixel position difference between the respective positions of the common feature point in the scan images 42a and 42b by a scaling factor.

For example, assume that the NDI scanner 14 has a capture rate of 10 full-array sets of sensor data per second (resulting in 10 scan strips per second), with the motion platform 12 moving at a speed of 2 inches per second in the X direction. Then the capture rate is 2/10 (or 0.2) inch per sample in the direction of travel. One set of sensor data of the full array is equivalent to one column of pixels, so in the X direction (which is the direction the vehicle is moving in) the scaling factor would be 0.2 inch per pixel. If the image processor 15 determined that there were 15 pixels in the X direction between a common feature point in one image compared to the common feature point in the next image, then the physical distance that the platform moved between image one and image two is 15*0.2=3 inches.

Figure 5:
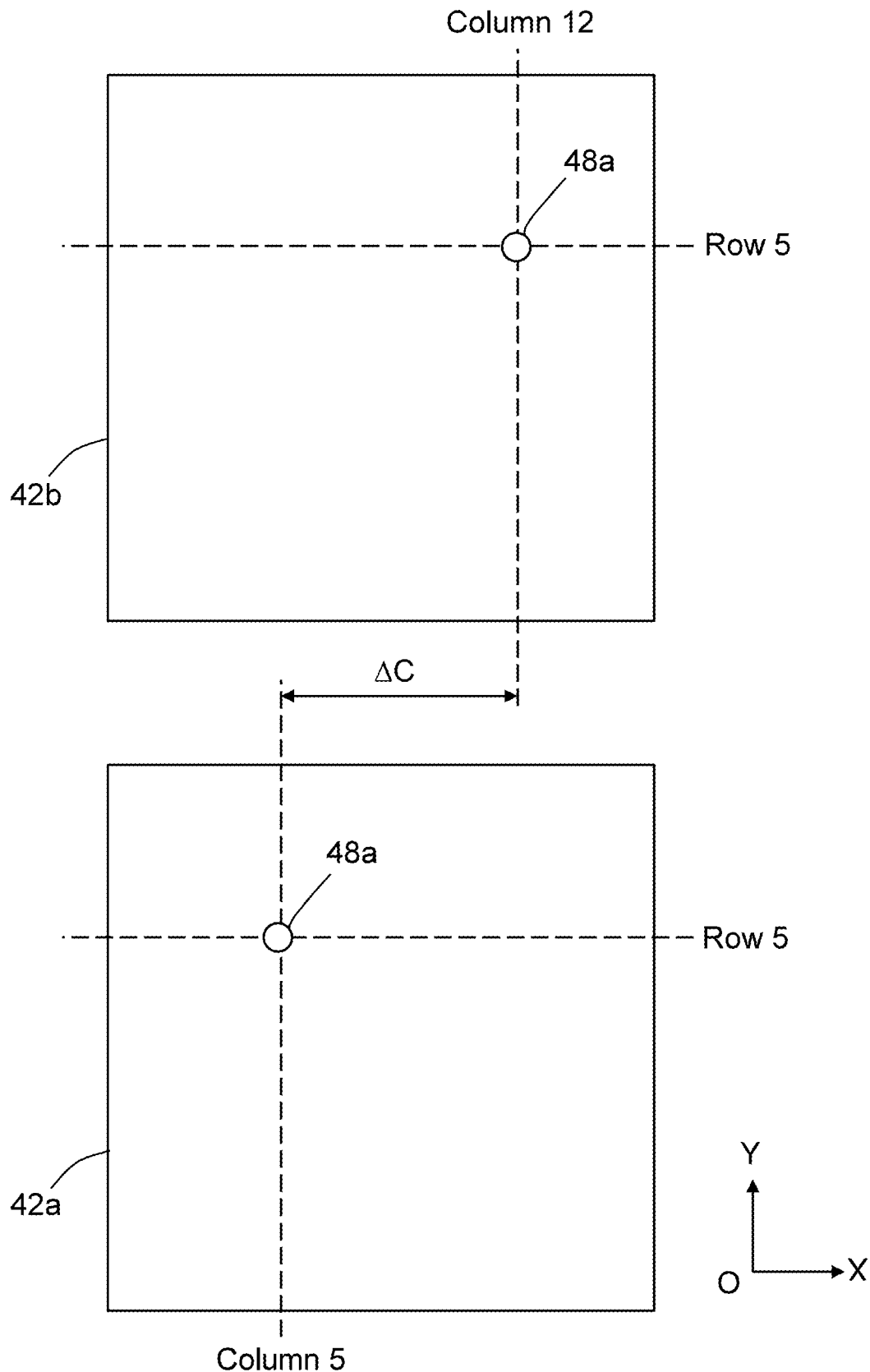
FIG. 5 is a diagram showing the positions of the common feature point in partially overlapping scan images constructed by aggregating scan image data acquired using a moving 1-D sensor array.

FIG. 5 is a diagram showing the positions of a common feature point 48a in partially overlapping scan images 42a and 42b constructed by aggregating scan image data acquired using a moving 1-D sensor array having one row of sensors. This example assumes that the motion platform 12 is controlled or constrained to move the NDI scanner 14 parallel to an X axis on the surface of the target object with the row of sensors disposed parallel to the Y axis (perpendicular to the X axis), in which case the centerline of the 1-D sensor moves from a first position having a first X position coordinate in a frame of reference on the surface of the target object to a second position having second X position coordinate at a distance from the first X position coordinate.

The image processing and feature point comparison module 24 (see FIG. 1) is configured to: (a) find feature points in the first and second scan images 42a and 42b; (b) determine which feature points found in step (a) are common feature points (e.g., common feature point 48a in FIG. 5) in the first and second scan images 42a and 42b; and (c) then count the number of pixel columns which separate pixels indicating the positions of common feature points 48a in the first scan image from pixels indicating the positions of the same common feature points in the second scan image (e.g., a first pixel indicating the position of common feature point 48a in the first scan image 42a and a second pixel indicating the position of common feature point 48a in scan image 42b in FIG. 5). This change in pixel position in terms of pixel columns is indicated by ΔC in FIG. 5. In this example, the pixel containing the common feature point 48a in scan image 42a is positioned in Row 5 and Column 5, whereas the pixel containing the common feature point 48a in scan image 42b is positioned in Row 5 and Column 12, meaning that ΔC=7 columns. If a calibration scaling factor $f_{cal}$ characterizing the relationship between the pixel column difference and the physical distance traveled by the 1-D sensor array were known, then the physical distance traveled by the 1-D sensor array in the X direction may then be computed by multiplying ΔC by the calibration scale factor $f_{cal}$. Then the second X position coordinate (indicating the position of the 1-D sensor array in the frame of reference of the target object) may be computed by adding the estimated physical distance traveled to the first X position coordinate.

In the above-described setup, the feature points are defined by significant local changes of intensity (represented as a change in contrast or color) which occur within the scan images. The system does not need to know which structural features within the physical object are represented by these virtual features; the system merely needs to detect the same pattern of pixels in sequential scan images. The overall concept is sometimes referred to as "solving the camera pose problem"—in this case the "camera" is the NDI scanner. The system tracks the set of points in successive scan images and determines their 2-D position from one scan image to the next scan image to derive the relative displacement of the common feature points in the scan images. This information is then used to compute the relative physical motion (position and orientation) of the motion platform 12 on which the NDI scanner 14 is mounted, for the period of time between one scan image and the subsequent scan image. In order for this technique to work satisfactorily for both position and orientation, there needs to be a sufficient number of common features. Theoretically, the minimum is two, but it is better to have more common feature points in order to improve the estimate.

The use of feature point comparison in a localization process has been disclosed elsewhere. For example, the simultaneous localization and mapping (SLAM) method uses data from one or more optical cameras or laser scanners and an extended Kalman filter to: (1) update the current state (position) estimate using dead reckoning data; (2) update the estimated position based on re-observed features (landmarks); and (3) add new features (landmarks) to the current state. In SLAM, relative displacements of feature points common to both images are used to provide the offset estimate. For this, relatively small position and orientation changes are required, along with substantial overlap between the images in order to achieve registration. Additionally, known reference dimensions of the 1-D sensor array are required to determine the scale of the displacement.

Various algorithms based on common feature points may be used to determine the distance moved by a scanner during a time interval separating two instants in time when two images are captured. These algorithms may be used to determine the position and orientation offsets between the two images. The process involves aligning two sets of common feature points acquired from the two images and determining the amount that one set of points had to be translated and rotated in order to achieve the optional alignment between the two sets of points. Such algorithms are configured to solve this point-to-point matching problem.

One of the methods that can be used determine the position and orientation offsets between the common feature points in two images (or more generally, between two sets of points) is to use the so-called Iterative Closest Point (ICP) algorithm, which is sometimes referred to as the "Iterative Corresponding Point" algorithm. In the present case the offsets are determined from the respective x and y pixel positions of common feature points in the two images.

The basic form of the ICP algorithm is described in a technical article entitled "A Method for Registration of 3-D Shapes", authored by Besl and Mckay in 1992 (hereinafter "1992 article"). Variations of the IPC algorithm are used by several of the SLAM methods to align groups of points (this type of alignment is also known as "registration"). There are several speed improvements to the concept that allows SLAM to run faster than the basic form of the ICP method, but the core idea is the same. The 1992 article describes a solution for points in a 3-D space (x, y, z) as well as points in a 2-D space (x, y), in addition to other types of geometric data. The system disclosed herein uses the form of the ICP algorithm that involves point sets. This method determines how much a first set of points has to translate or rotate from its starting position and orientation to another position and orientation that minimizes the overall distance between the first set of points and a second set of points.

The basic form of the ICP algorithm is the following: (1) for each point in a given set of point data, compute the closest point in the other set using a distance metric; (2) estimate the amounts of translation and rotation needed to align the sets of points; (3) transform the points in one set by the amount determined in the translation and rotation estimates; (4) iterate (i.e., return to step (1) to compute the closest points again); and (5) stop the iteration when a predetermined distance metric value is achieved (e.g., a distance metric value equal to a specified threshold).

To start, the distance from each point in each set of points is determined using a distance measurement or "distance metric" (here a mean-square distance metric is used); then one of the point sets is moved (offset) in order to reduce the mean-square distance. The ICP method requires an initial estimate of the position and orientation offsets. In the instant application, a rough approximation of the offsets is made using the desired direction of travel and a current velocity estimate of the motion platform (this approximation does not have to be very accurate). Then the distance measurements are computed again, after which new estimates for the position and orientation offsets are computed using an iterative optimization method such as the gradient descent method. This iteration continues until a convergence criterion is reached. Ideally, if each point in one set had exactly one corresponding point in the other set of points and all of the points were acquired accurately, the overall offset determined by the mean-square distance metric would be zero, but since there may be outlier points in one set that do not align with points in the other set (as well as small errors in acquisition accuracy), the optimal mean-square distance will not be zero. For realistic scenarios in which there are some points in common between the two sets and some that are not common, the method will not reach a zero mean-square distance. So the overall method needs to determine when to stop the iterative search, which is usually when the rate of convergence slows to some specified amount.

The common feature points are the points with the smaller closest point distance values compared to the points with the largest closest point distance values. The basic ICP algorithm finds the common feature points along the way, but the ICP algorithm does not need to know which points they are before starting the rest of the processing. For the method to work, a sufficient number of common feature points are still required, but they don't need to be explicitly found in a dedicated separate step from the position and orientation offset determination process. As the iterations are performed, the common feature points are discovered, and in some variations of the ICP process, the not-common feature points (e.g., the outliers) are culled from the analysis early in the process in order to speed up the convergence (reducing the number of iterations needed). In other methods, or other variations of the ICP method, the outliers may be culled first from the common feature points to improve performance.

In summary, the ICP technique uses common feature points between two sets of points to determine the position and orientation offsets of one point set relative to the other point set. Depending on the specific algorithm used, the finding of the common feature points from both sets of points may or may not be a separate step from the use of the points to determine the position and orientation offsets. For example, some versions of the ICP algorithm determine the common feature points concurrently with determining the position and orientation offsets.

To compute the absolute displacement in the frame of reference of the surface of the target object, the system proposed herein sums the relative displacements together after each set of scan images is processed, which is known as dead reckoning. However, as more and more discrete relative distance values are added together, the absolute location estimate becomes less accurate, so to address this deviation, one may compare the features appearing in the scan images to landmarks/features with known coordinates. The absolute location estimate is updated based on these known coordinates, which serves to re-calibrate the system. The image-to-image feature tracking happens at a high update rate, and the comparison to known landmark/feature data happens at a lower update rate.

Figure 6:
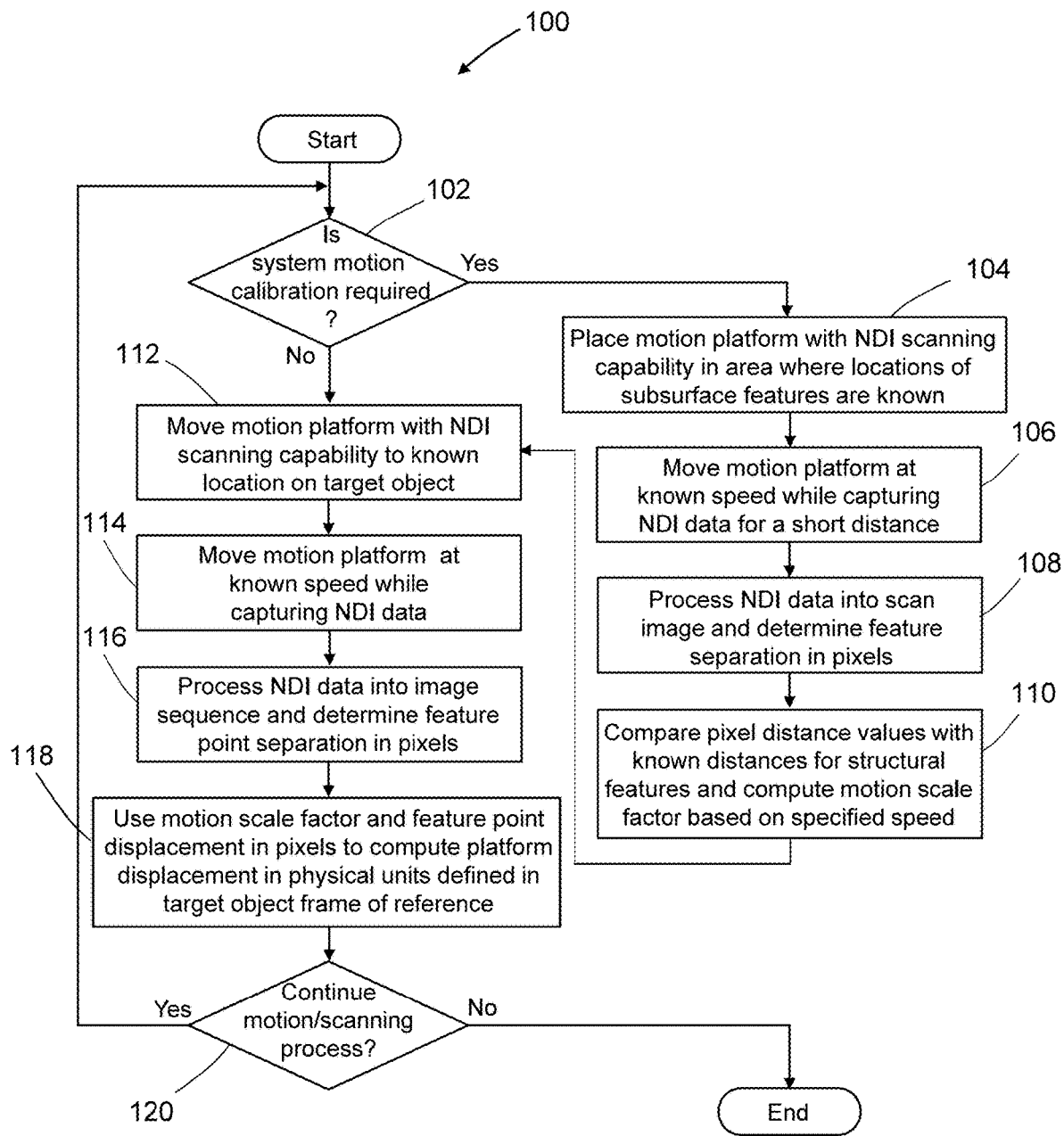
FIG. 6 is a flowchart identifying steps of a method for tracking the location of an NDI scanner in the frame of reference of a target object using scan images derived from sensor data acquired by the scanner's 1-D sensor array in accordance with an alternative embodiment.

FIG. 6 is a flowchart identifying steps of a method 100 for tracking the location of a 1-D sensor array in the frame of reference of a target object using scan images derived from sensor data in accordance with an alternative embodiment. At the start, a determination is made whether system motion calibration is required or not (step 102). If a determination is made in step 102 that system motion calibration is required, the motion platform 12 with NDI scanner 14 is placed on the surface of the target object on one side of an area where the positions and separation distances of structural features are known (step 104). Otherwise, if a determination is made in step 102 that system motion calibration is not required, the motion platform 12 with NDI scanner 14 is moved to a known location on the surface of the target object at which the NDI scanning procedure will be initiated (step 112).

During the system motion calibration procedure, the motion platform 12 starts to translate the NDI scanner 14 from one side toward the other side of the known area at a known speed. As the motion platform 12 translates at known speed (assuming no wheel slippage), the NDI scanner 14 is activated to capture NDI sensor data at a known capture rate for a short distance (step 106). More specifically, the sensors of the 1-D sensor array of the NDI scanner 14 are activated in sequence repeatedly at regular intervals of time, resulting in a sequence of sets of NDI sensor data. The sets of NDI sensor data are converted into respective scan strips and then the scan strips are aggregated to form a composite scan image. The difference in the positions of two feature points in the scan image—corresponding to two structural features of the target object separated by a known physical distance—is then determined (step 108). For example, the difference in position may be expressed in terms of number of pixel columns separating the respective pixels corresponding to the centroid of the features of interest. A calibration scaling factor is then computed by dividing the known separation distance of the two structural features by the pixel position difference of the corresponding virtual feature points in the scan image (step 110). Digital data representing the value of the calibration scaling factor is stored in a non-transitory tangible computer-readable storage medium (e.g., computer memory).

Upon completion of the calibration procedure, the motion platform 12 with NDI scanner 14 is placed on the surface of the target object at the known location selected as the starting point for the NDI scanning procedure (step 112). During the NDI scanning procedure, the motion platform 12 translates the NDI scanner 14 at known speed. As the motion platform 12 translates at known speed, the NDI scanner 14 is activated to capture NDI sensor data at a known capture rate (step 114). More specifically, the sensors of the 1-D sensor array of the NDI scanner 14 are activated in sequence repeatedly at regular intervals of time, resulting in a sequence of sets of NDI sensor data. The sets of NDI sensor data are converted into respective scan strips and then the scan strips are aggregated to form partially overlapping scan images. The difference in the positions of the common feature point appearing in the partially overlapping scan images is then determined (step 116). For example, the difference in position may be expressed in terms of number of pixel columns separating the respective pixels corresponding to the centroid of the common feature point. The physical distance traveled by the motion platform 12 is then computed by multiplying the difference between the respective positions of the common feature point in the first and second scan images by the calibration scaling factor (step 118). The computed travel distance may be used to compute the current absolute location of the motion platform 12 (and NDI scanner 14) in the frame of reference of the target object by adding the computed platform displacement to a previous absolute location.

A determination is then made whether the motion/scanning process should be continued or not (step 120). If a determination is made in step 120 that the motion/scanning process should be continued, then method 100 returns to step 102. Otherwise, if a determination is made in step 120 that the motion/scanning process should not be continued, then method 100 is terminated.

Figure 7:
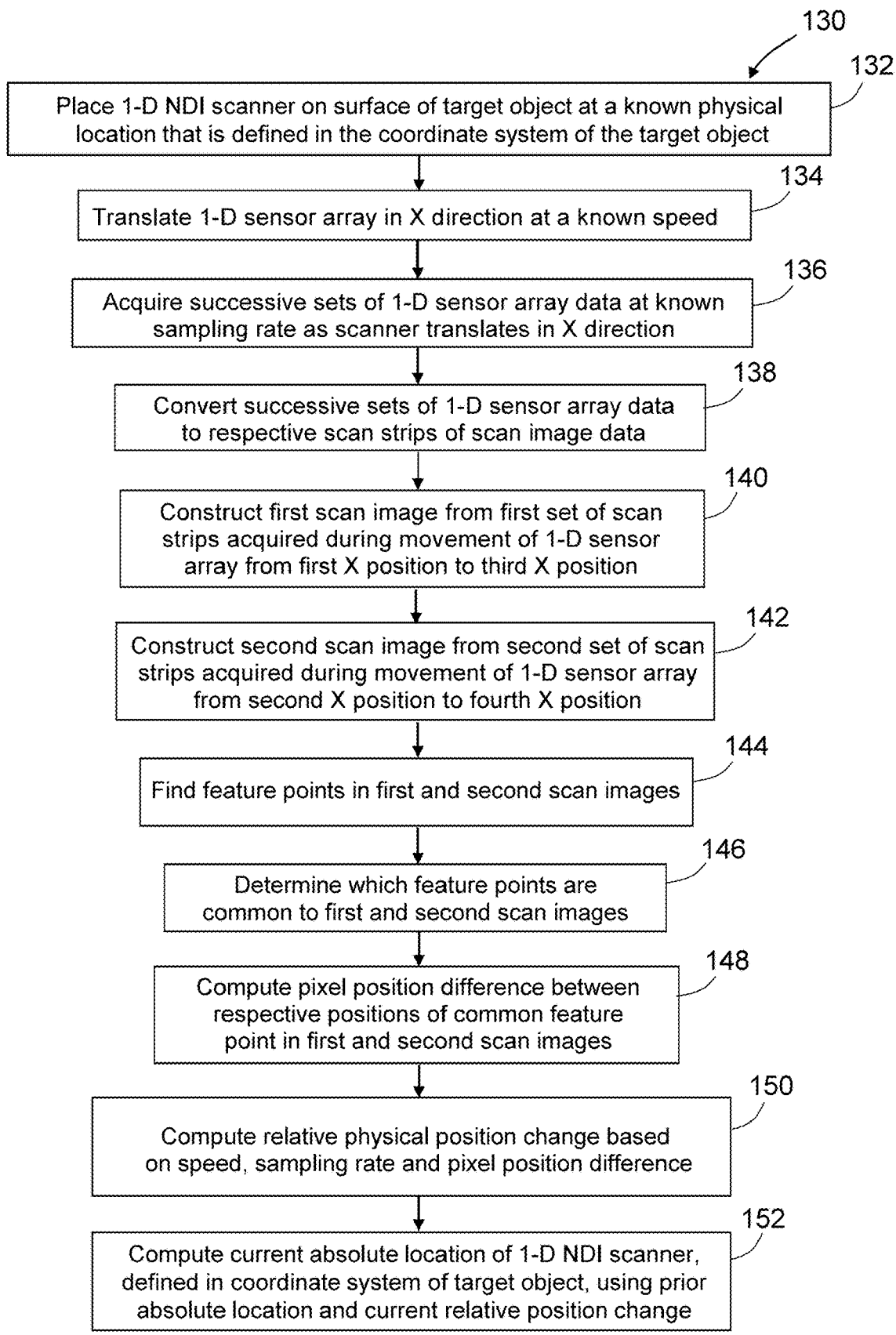
FIG. 7 is a flowchart identifying steps of a method for computing a current absolute location of a 1-D NDI scanner, defined in a coordinate system of the target object, by comparing partially overlapping scan images, computing a current relative position change using common feature points and then adding that relative position change to a previous absolute location.

FIG. 7 is a flowchart identifying steps of a method 130 for computing a current absolute location of a 1-D NDI scanner, defined in a coordinate system of the target object, in accordance with one embodiment. During set-up of the system, the 1-D NDI scanner (including a 1-D scanner array and associated circuitry) is placed on the surface of the target object at a known physical location (also referred to herein as initial "absolute location") that is defined in the coordinate system of the target object (step 132). The 1-D NDI scanner is then translated across the surface of the target object in an X direction at a known speed from a first X position to second, third and fourth X positions in succession (step 134). Successive sets of sensor data are acquired at a known capture rate as the scanner translates in the X direction (step 136). The successive sets of sensor data are converted to respective scan strips of scan image data (step 138). An image processor then constructs a pair of scan images by aggregating scan strips. More specifically, a first scan image is constructed from a first sequence of scan strips converted from sensor data acquired during movement of the 1-D sensor array from the first X position to the third X position (step 140); and a second scan image is constructed from a second sequence of scan strips converted from sensor data acquired during movement of the 1-D sensor array from the second X position to the fourth X position (step 142). The image processor (more specifically, the image processing and feature point comparison module 24) then finds feature points in the first and second scan images (step 144) and determines which feature points found in step 144 are common feature points in the first and second scan images (step 146). The image processor computes a pixel position difference between the respective positions of a common feature point in the first and second scan images (step 148) and computes a scanner displacement by multiplying the pixel position difference computed in step 148 by a scaling factor representing a distance traveled by the scanner per scan strip (step 150). More specifically, the image processor computes the relative physical position change of the 1-D sensor array based on the known speed, known capture rate and difference between respective positions of the common feature point in the first and second scan images. In one proposed implementation, the relative physical position change is the distance separating the first and second X positions (hereinafter "scanner displacement") in the frame of reference of the target object. The current absolute location of the 1-D NDI scanner, defined in the coordinate system of the target object, is then computed using the prior absolute location and the current relative position change (step 152).

In accordance with one proposed implementation, the distance separating the first and second X positions is computed by multiplying a pixel position difference between the respective positions of the common feature points in the first and second scan images by a scaling factor representing a distance traveled by the scanner per scan strip. The pixel position difference is computed by counting a number of pixel columns by which the position of the common feature point in the second scan image is offset from the position of the common feature point in the first scan image. The scaling factor is computed by dividing the known speed of the motion platform by the known capture rate of the NDI scanner.

In one proposed implementation, the computer system is further configured to associate respective time stamps with the scan strips of scan image data to mark when the corresponding set of sensor data was captured. The time stamps may be used to compute the X position coordinate of the NDI scanner 14 at the time when a scan strip of interest (e.g., a scan strip containing a feature point of interest) was acquired by multiplying a time interval by the known speed of the motion platform, the time interval being bounded by a first time stamp associated with a scan strip acquired at an X position having a known X position coordinate and a second time stamp associated with the scan strip of interest.

In some use cases, the user may be looking at a display of a single NDI scan image and want to extract position coordinates of a single feature of interest. In the context of the method partly depicted in FIG. 7, the user may find a feature point in a scan image representing a structural feature of interest in the target object. A computer system may be configured (e.g., programmed) to calculate an X position coordinate of the structural feature based on an X position coordinate of the one-dimensional sensor array at a time when a scan strip including the feature point was acquired. In one proposed implementation, the computer system is further configured to associate respective time stamps with the scan strips of scan image data to mark when the corresponding set of sensor data was captured. In the case of a wheeled motion platform, the X position coordinate of the structural feature of interest may be computed based at least partly on a correction for wheel slippage.

As previously mentioned, the localization methodology is a dead reckoning process which becomes less accurate as more discrete relative distance values are summed. A correction process may be used along with the basic relative localization process to improve the location estimate based on knowledge of identified common features within the scan image whose position coordinates are known. This correction process, running at a lower update rate than the primary feature tracking process, can be used to improve the location estimate to compensate for feature compounding measurement errors.

The 1-D NDI sensor-based localization process proposed herein is applicable to automated motion control systems using feedback control (such as robots and surface-crawling vehicles). For automated movement, the 1-D NDI scanner may be mounted to the frame of a crawler vehicle (e.g., a holonomic-motion or non-holonomic-motion crawler vehicle). For example, a tethered crawler vehicle capable of scanning a 1-D sensor array on a surface of a fuselage is disclosed in U.S. Pat. No. 8,738,226. In alternative embodiments, the 1-D sensor array may be mounted to vacuum-adhering crawler vehicles of the types disclosed in U.S. Pat. Nos. 8,738,226 and 10,168,287. Automated movement may alternatively be achieved by mounting an NDI scanner to a frame assembly that is coupled to an end effector at the distal end of a manipulator arm (articulated, telescopic, gantry, etc.). (As used herein, the term "end effector" means the device mounted on the last link of an automated apparatus comprising an arm, at which endpoint a frame assembly that supports an NDI scanner is coupled.) A suitable robot comprising an articulated arm is disclosed in U.S. Pat. No. 9,933,396. In accordance with an alternative automated system, the NDI scanner may be carried by an unmanned aerial vehicle that flies to the target area and then drags a sensor array over the surface of the target area. For example, U.S. Pat. No. 11,079,760 discloses an unmanned aerial vehicle which carries a 1-D sensor array.

In accordance with alternative embodiments, the system includes a motion platform comprising a frame, a pair of 1-D sensor arrays separated by a fixed distance and a computer system communicatively coupled to receive sensor data from the pair of 1-D sensor arrays. In this case, the two 1-D sensor arrays are oriented perpendicular to the direction of movement. As long as the motion platform 12 is moved far enough so that each 1-D sensor array acquires some of the same features, then the location tracking method proposed herein may be performed by using the feature point alignment technique to track the differences in the positions of the common feature point appearing in the pair of scan images. The motion platform may be either manually movable (hand-held) or motorized (automated).

Figure 8:
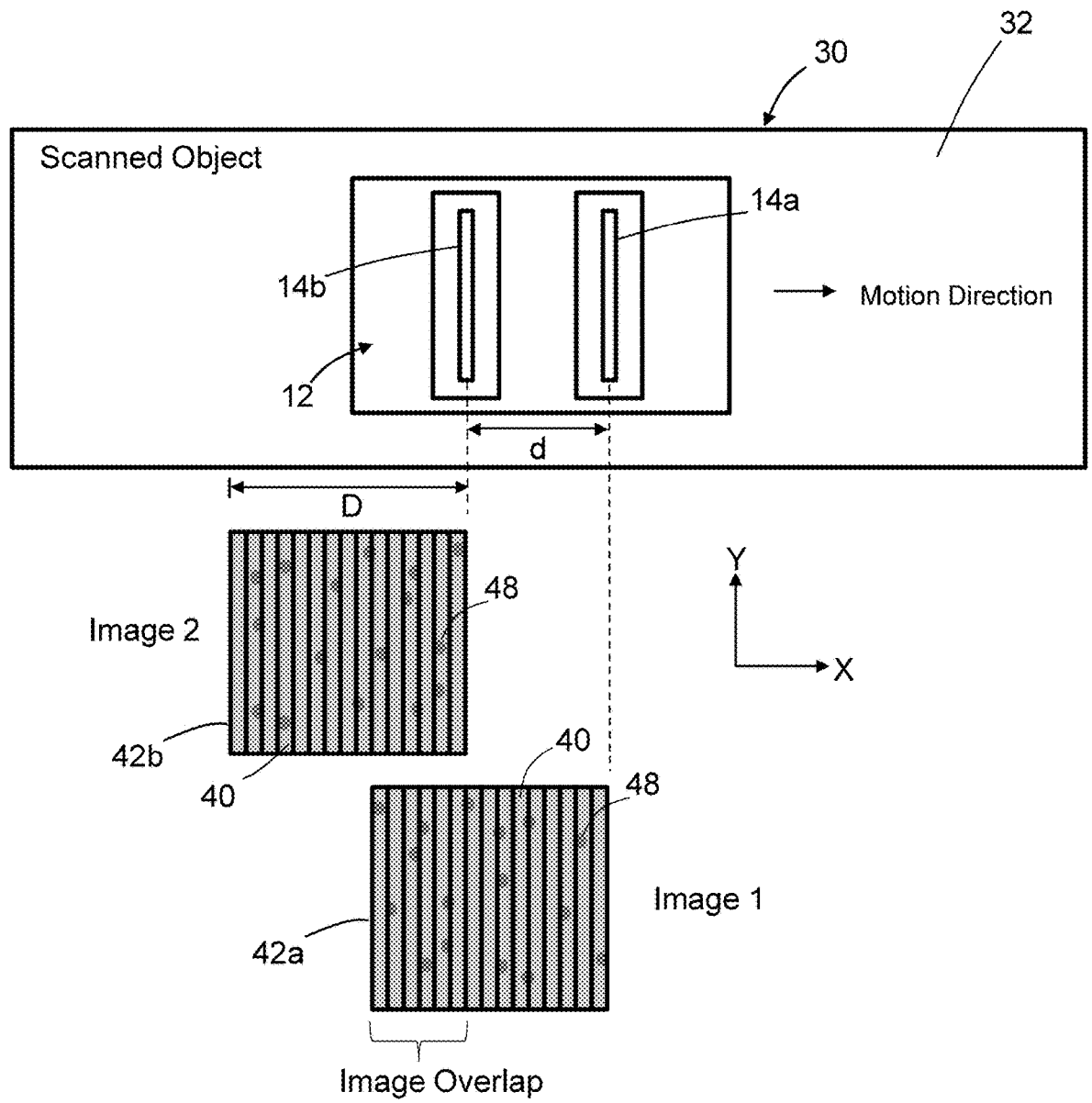
FIG. 8 is a diagram showing a top view of a motion platform equipped with a pair of mutually parallel 1-D sensor arrays in accordance with an alternative embodiment and moving on a surface of a target object.

FIG. 8 is a diagram showing a top view of a motion platform 12 moving on a surface 32 of a target object 30. The direction of motion is indicated an arrow directed rightward in FIG. 8. The motion platform 12 carries a pair of NDI scanners 14a and 14b including respective 1-D sensor arrays having centerlines which are oriented mutually parallel and separated by a fixed distance d. As the motion platform 12 translates across the surface 32, the NDI scanners 14a and 14b are activated to concurrently acquire NDI sensor data containing information concerning respective underlying subsurface structures of the target object 30. That NDI sensor data is converted into respective sequences of scan strips, which sequences of scan strips may be aggregated to construct a pair of partially overlapping scan images 42a and 42b. In the example depicted in FIG. 8, the NDI scanner 14a includes the leading 1-D sensor array, whereas the NDI scanner 14b includes the trailing 1-D sensor array. Scan image 42a is derived from the sensor data acquired by NDI scanner 14a; scan image 42b is derived from the sensor data acquired by NDI scanner 14b. As indicated in FIG. 8, the scan images 42a and 42b encompass respective areas on the surface 32 having a length D in the X direction. In order to ensure that the scan images 42a and 42b partially overlap, the condition d<D must be satisfied.

During translation of motion platform 12, the NDI scanners 14a and 14b pass over the same portion of the target object 30, but at different times. As a result, any common virtual features appearing in the scan images, corresponding to the structural features in that same portion of the target object 30, will have different positions within the respective image frames. The feature point alignment technique may be used to determine the difference in the respective positions of the common feature point in the manner previously described herein. From this imaged position difference, the change in position of the motion platform—namely, the platform displacement from the platform position where the first NDI scanner 14 imaged a particular structural feature to the subsequent platform position where the second NDI scanner 14*b* imaged the same structural feature—can be computed. More specifically, the change in position of the motion platform 12 may be determined using the image pair comparison technique. That relative change in position may then be used to compute the absolute position of the motion platform 12 (and the absolute positions of the NDI scanners 14*a* and 14*b*).

In accordance with one embodiment, the location of the motion platform 12 on surface 32 is tracked (using images of a target object acquired by the NDI scanner as disclosed herein) while the NDI scanners 14*a* and 14*b* are translating in tandem across the surface 32 of target object 30 in the X direction at a known speed. During this translation, the NDI scanner 14*a* moves from a first X position to a third X position while the NDI scanner 14*b* moves from a second X position to a fourth X position, wherein the second X position is between the first and third X positions, and the third X position is between the second and fourth positions. During translation in tandem, the NDI scanner 14*a* is operated to acquire a first sequence of sets of sensor data at a known capture rate as the NDI scanner 14*a* moves from the first X position to the third X position, whereas the NDI scanner 14*b* is operated to acquire a second sequence of sets of sensor data at the known capture rate as the NDI scanner 14*b* moves from the second X position to the fourth X position. The first sequence of sets of sensor data are converted to a corresponding first sequence of scan strips of scan image data, whereas the second sequence of sets of sensor data are converted to a corresponding second sequence of scan strips of scan image data. The number of scan strips in the second sequence is the same as a number of scan strips in the first sequence. Furthermore, the image processor 15 (not shown in FIG. 8) constructs the scan image 42*a* from the first sequence of scan strips and the scan image 42*b* from the second sequence of scan strips. Then the image processor 15 finds feature points in the first and second scan images 42*a* and 42*b* and determines which feature points found in the first and second scan images 42*a* and 42*b* are common feature points. The common features visible in the scan images 42*a* and 42*b* represent structural features of the target object. The image processor 15 then computes a scanner displacement by multiplying a pixel position difference between the respective positions of the common feature points in the first and second scan images by a scaling factor representing a distance traveled by the first and second scanners per scan strip. In accordance with one proposed implementation, the pixel position difference is computed by counting a number of pixel columns by which the position of a common feature point in the second scan image 42*b* is offset from the position of the common feature point in the first scan image 42*a*. The NDI sensor data processor 20 is configured to associate respective time stamps with the scan strips of scan image data to mark when the corresponding set of sensor data was captured. The image processor 15 is further configured to: (a) compute an estimated speed of the motion platform based on the fixed (known) distance between NDI sensor scans and a time interval having a duration equal to a difference between a time stamp associated with a scan strip of the first sequence of scan strips in which the common feature appears and a time stamp associated with a scan strip of the second sequence of scan strips in which the common feature appears; and (b) compute the scaling factor by dividing the estimated speed by the known capture rate.

This disclosure describes motion platform navigation control techniques that use the scan image data (derived from sensor data acquired by 1-D sensor arrays) in real time to enhance the localization process by providing more refined position control. More specifically, the disclosed techniques improve the accuracy of the captured localization information (scan image data), which localization information is used to control navigation of the motion platform. The NDI sensors augment the motion control system of the motion platform by providing sensor data that is processed to determine location and direction of motion. In accordance with the improvements disclosed herein, the performance of the NDI scanner tracking system is enhanced by: (1) using depth and intensity filtering of the scan image data to differentiate features for improved landmark identification during real-time motion control; and (2) applying a loop-closure technique using scan image data to correct for drift in computed location. A detailed process sequence and implementation techniques for incorporating these method enhancements into an NDI inspection process will now be described.

Figure 9:
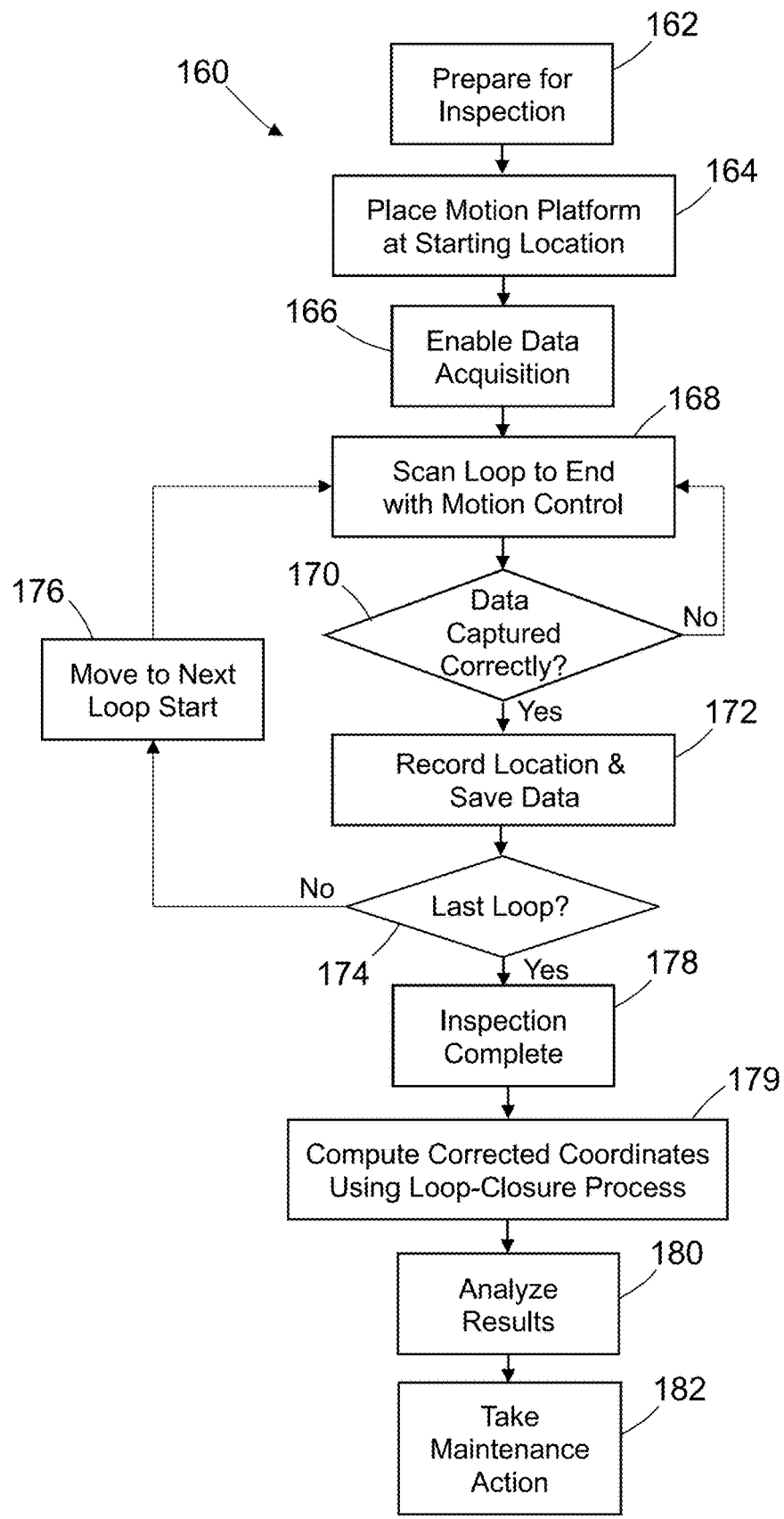
FIG. 9 is a flowchart identifying steps of a method for enhanced vehicle navigation using linear sensor arrays during non-destructive inspection of a target object.

FIG. 9 is a flowchart identifying steps of a method 160 for enhancing vehicle navigation using linear (1-D) sensor arrays during non-destructive inspection of a target object. At the outset the inspection team prepares for the inspection (step 162). The sub-steps involved in inspection preparation may include positioning calibration, NDI calibration, and generating and loading a path plan into the computer system that will process the image and location data acquired during the automated inspection process. Initially, the motion platform is positioned on the surface of a target object at a starting location (step 164).

The known starting location includes a starting position and a starting orientation of the motion platform in the coordinate system of reference of the target object. The starting position corresponds to a point on the target object surface where a first loop begins. The path plan includes the first loop and successive loops. The motion platform may be placed so that a reference point on the platform is positioned at the starting position and the motion platform is oriented (rotated about the reference point) to match the starting orientation. The technique employed to place the motion platform at the starting location may use any one of the following: a global positioning system (GPS), 3-D laser scanning (Lidar), computer-aided design (CAD) geometry, motion capture feedback control (e.g., using a motion capture system of the type disclosed in U.S. Pat. Nos. 7,643,893 and 8,892,252), a local positioning system (LPS) (e.g., using an LPS of the type disclosed in U.S. Pat. No. 7,859,655), or human positioning.

After the motion platform has been positioned at the starting location identified in the path plan, the data acquisition equipment (e.g., an NDI scanner) onboard the motion platform is enabled (step 166). Then the NDI scanner (including a 1-D sensor array) scans a swath on the target object as the motion platform travels along a first loop (defined in the path plan) to an ending location with motion control (step 168). In particular, depth and intensity filtering of the scan image data is utilized to differentiate features for improved landmark identification during real-time motion control. Ideally, the ending location is co-located with the starting location, but in practice the ending location may be offset from the starting location by an amount which will be measured, as described in more detail below).

The computer system that receives the captured image data from the NDI scanner monitors that image data and determines whether the image data was captured correctly or not (step 170). On the one hand, if a determination is made in step 170 that the image data was not captured correctly, then method 160 returns to step 168 and the first loop is scanned again. On the other hand, if a determination is made in step 170 that the image data was captured correctly, then the data acquisition locations are recorded and associated with the image data which is saved in a non-transitory tangible computer-readable storage medium (step 172).

After the data acquired during scanning of the current loop has been saved, a determination is made whether the current loop is the last loop or not (step 174). On the one hand, if a determination is made in step 174 that the current loop is not the last loop, then the motion platform is moved to the starting location of the next loop defined in the path plan (step 176). Steps 168, 170, and 172 are performed iteratively for each loop defined in the path plan. On the other hand, if a determination is made in step 174 that the current loop is the last loop (i.e., inspection is complete), then the motion platform stops and is removed from the surface of the target object (step 178).

Upon completion of the inspection, corrected coordinates of successive data acquisition locations on the surface of the target object are computed using the loop-closure process proposed herein (step 179). The inspection results may be analyzed subsequent to correction of the coordinates of the data acquisition locations (step 180). Based on the results of the analysis, an appropriate maintenance action may be taken with respect to the target object (step 182). For example, a determination may be made that the inspected structure may be used as is. In the alternative, the analysis results may indicate the presence of an anomaly in the structure of the target object. In accordance with alternative dispositions, the inspected structure may be tagged or marked for repair or scheduled for a follow-up inspection at a future time.

In particular, the analysis of results includes applying a loop-closure technique to the scan image data to correct for drift in the computed locations of a point on the NDI scanner (e.g., a mid-point of a 1-D sensor array of the scanner), which computed locations are associated with the corresponding scan image data acquired as the NDI scanner navigates along each loop path. The loop-closure process happens after the scanning system (e.g., robot) arrives at the ending location of a loop path. More specifically, the loop-closure process runs after a feature comparison process determines that the features in the scan image acquired at the ending location match features acquired from the scan image at the starting location (indicating that the robot has returned to the start of the loop path). The loop-closure process and feature comparison process are separate from the primary run-time location estimation process.

Figure 10:
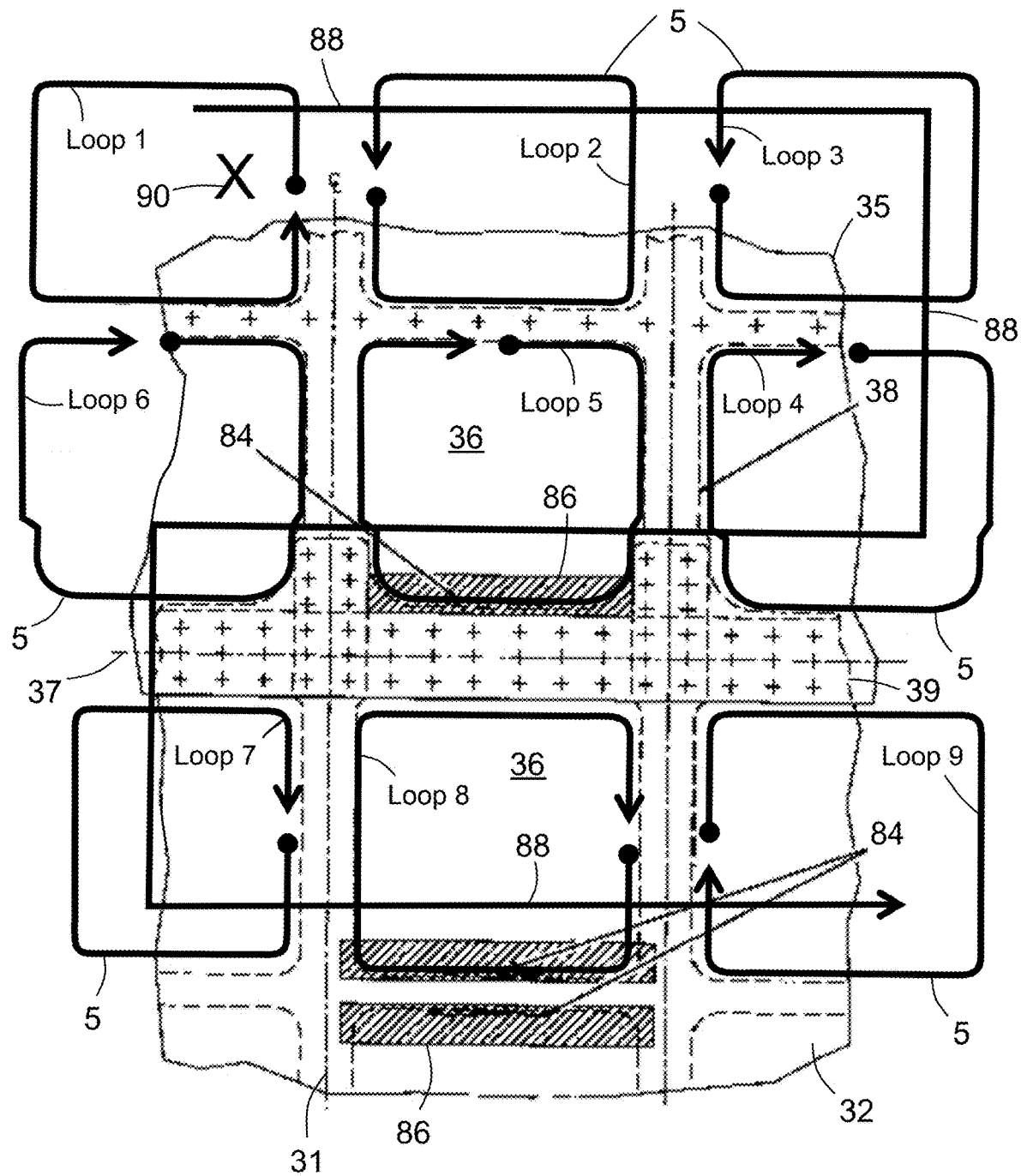
FIG. 10 is a diagram representing a scanning environment with an overlaid high-level path plan and a plurality of low-level loop paths for non-destructive inspection of an aircraft fuselage using a scanner that travels on the external surface of the fuselage skin in accordance with one proposed implementation.

FIG. 10 is a diagram representing a scanning environment with an overlaid path plan in accordance with one example. The path plan includes a high-level path plan 88 and a plurality of low-level loop paths 5 (hereinafter "loop path 5") for non-destructive inspection of an aircraft fuselage using an NDI scanner-equipped motion platform (not shown in FIG. 10) that travels on the external surface 32 of an aircraft fuselage skin 35 in accordance with one proposed implementation. The starting location 90 is indicated by a "x" symbol. The loop paths 5 in FIG. 10 are respectively designated Loop 1 to Loop 9. In one example inspection procedure, the motion of a motion platform is controlled so that a mid-point of a 1-D sensor array of the NDI scanner follows each loop path 5 in succession. The high-level path plan 88 (represented by a serpentine arrow in FIG. 10) merely depicts the order in which the loop paths 5 will be followed and does not correspond to an actual path to be traveled by the mid-point of the 1-D sensor array.

In the example scenario depicted in FIG. 10, the contours of loop paths 5 match the contours of respective chemically milled pockets 36 formed in the aircraft fuselage skin 35, some of which have cracks 84. A vertical frame centerline 31 and a horizontal stringer centerline 37 are indicated by respective straight chain lines in FIG. 10. Sub-surface structural features 38 and 39 are indicated by dashed lines. The inspection bands 86 indicate respective areas of coverage where the 1-D sensor array scans a band-shaped area that overlies a respective crack 84 formed along a perimetral portion of the chemically milled pocket 36.

Figure 11:
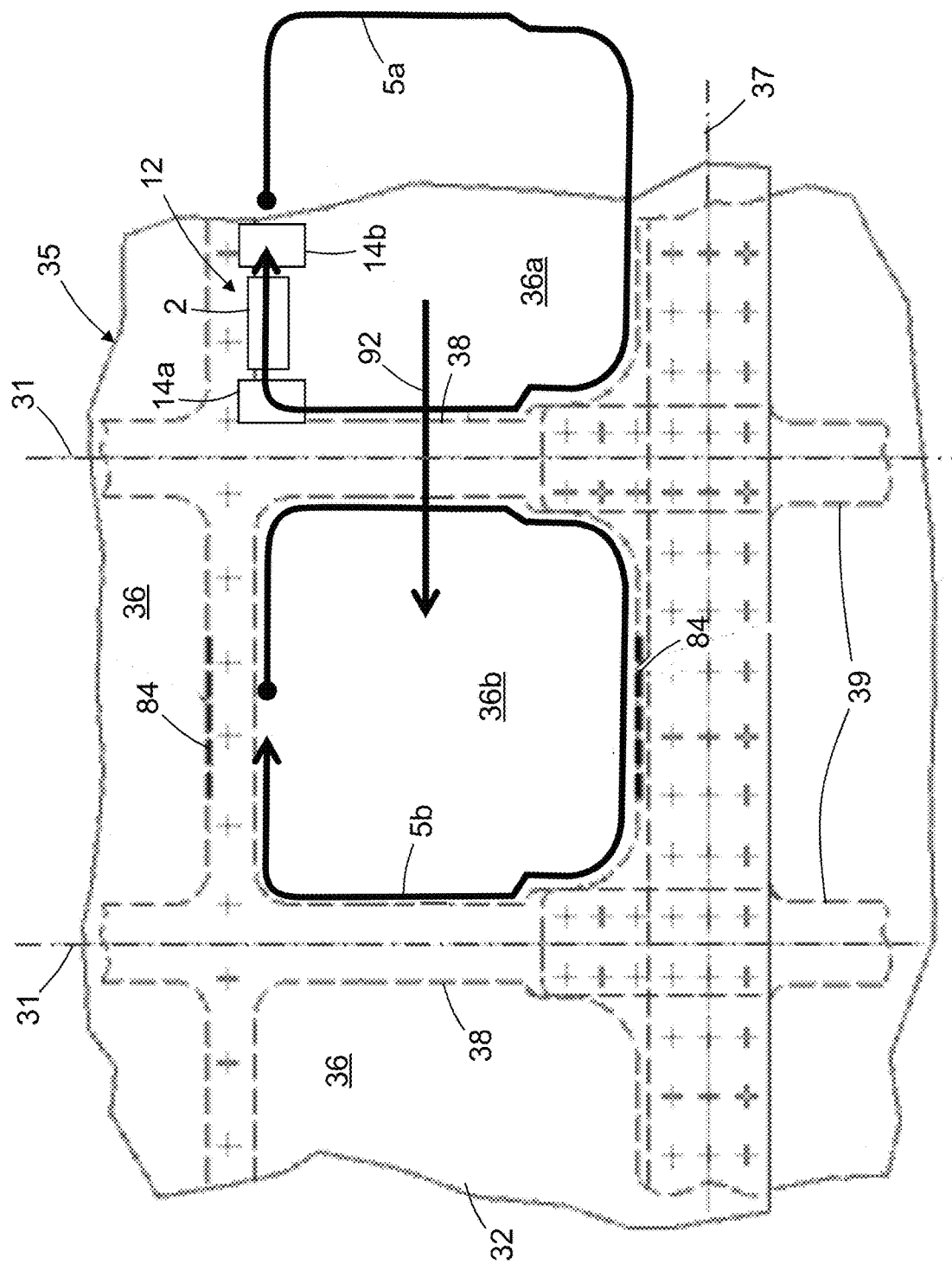
FIG. 11 is a diagram showing a stage in an NDI process wherein the motion platform has traveled to the end point of a first loop path before transitioning to the starting point of a second loop path on the external surface of a fuselage skin.

FIG. 11 is a diagram showing a stage in an NDI process wherein a motion platform 12 (only frame 2 and front and rear NDI scanners 14*a* and 14*b* of the motion platform are shown) has traveled to the end point of a loop path 5*a* before transitioning to the starting point of a loop path 5*b* on the external surface 32 of an aircraft fuselage skin 35. The transition 92 is represented by an arrow pointing leftward. The actual path of the motion platform 12 as it travels from an ending location on loop path 5*a* to a starting location on loop path 5*b* is not shown in FIG. 11. Each loop path follows a respective perimeter of a respective chemically milled pocket 36.

For example, in the scenario depicted in FIG. 11, the motion platform 12 first scans the perimeter of chemically milled pocket 36*a* as the 1-D sensor array (carried by the motion platform) travels along loop path 5*a* from a first starting location to a first ending location. The motion control program seeks to control the motion of motion platform 12 so that the first ending location is the same or nearly the same as the first starting location, but in practice there will likely be an offset between the first starting location and first ending location (hereinafter "location offset"). The location offset includes both a position offset and an orientation offset, and is used to correct the ending location estimate, as well as location estimates for the acquired path data. Second, the motion platform 12 travels from the first ending location on loop path 5*a* to a second starting location on loop path 5*b*. Third, the motion platform 12 scans the perimeter of chemically milled pocket 36*b* as it travels along loop path 5*b* from the second starting location to a second ending location. Again, the motion control program seeks to control the motion of motion platform 12 so that the second ending location is the same or nearly the same as the second starting location, but in practice there will likely be a location offset.

As disclosed above, the motion control program receives and relies on information provided by a system that is configured to track the location of an NDI scanner using images of a target object acquired by the NDI scanner. In accordance with the improvements proposed herein, the performance of the NDI scanner tracking system is enhanced by: (1) using depth and intensity filtering of the scan image data to differentiate features for improved landmark identification during real-time motion control; and (2) applying a loop-closure technique using scan image data to correct for drift in computed location.

In accordance with the first enhancement, the time-of-arrival of the reflected signal (which parameter is proportional to reflector depth) and the intensity range within the scan image data (i.e., different features at different depths, or equivalently, different colors) are used to advantage. By using depth and intensity information, the process can filter on different types of features, which can then be used for different aspects of motion control. For example, if specific features were detectable in different layers of an assembly, different types of actions could be taken when those features are encountered (detected). For example, the depth and intensity filtering may be designed to detect an edge of a chemically milled pocket, whereas the motion control program is configured to control the motion platform such that a mid-point of a 1-D sensor array of an NDI scanner carried by the motion platform follows the pocket edge. The depth information comes from the timing of the NDI sensor data that is associated with the distance of the reflecting interface from the NDI sensor, and the intensity information represents the strength of the reflected signal.

The scan image data is depth and intensity filtered. The filtered scan image data is then used for navigation. In accordance with one proposed implementation, filter threshold values for depth and intensity are selected that are associated with specific types of features. The depth and intensity data derived from filtering are then used to create an action/response. For example, a part or workpiece being scanned by the NDI scanner may be made of several components that have features (edges or surfaces) at different relative depths from the surface where the NDI scanner is located. When a feature at a specific relative depth is detected, that feature can be used to trigger a specific type of response, such as a discrete response (e.g., stop moving in the current direction, and turn e degrees clockwise) or a continuous feedback response (e.g., continue following an edge at a specific depth). The process uses filters to sort out the features of interest and ignore things that do not fit within the filter parameters. These filters are basically rules that are defined based on the desired response needed. The filtering rules may be programmed by a person, or in some cases generated in a semi-automated way based on a high-level goal provided by the user and other data about the part (such as a 3-D CAD model). For example, the user may instruct the system to follow an edge at a specific depth range within a specific intensity range until the vehicle returns to the same location, and then proceed to another step in the process.

The core part of the loop-closure process is associated with the computing of a more accurate estimate of the loop path traveled by the 1-D sensor array during each loop scan. The loop-closure process is a software application which is configured to compute an updated, more accurate estimate of the position and orientation for each of the incremental values along the loop path, but the loop-closure process needs to be told when to run. The feature comparison process lets the computer system know when the end of the loop path has been reached. This feature comparison process is continuously running while the data collection task is happening to look for a match between the feature data derived from the sensor data acquired while the 1-D sensor array is at the ending location and the feature data derived from the sensor data acquired while the 1-D sensor array is at the starting location. In other words, the sensor data is post-processed after the location offset between the starting and ending locations has been determined from the scan image data by the feature comparison process.

A loop-closure technique is disclosed in U.S. Pat. No. 9,423,250 which involves a process to correct for the acceleration drift from an inertial measurement unit (IMU) by using the known starting and ending locations—which could be the same location or different locations, as long as they are known. The IMU-based loop-closure technique disclosed in U.S. Pat. No. 9,423,250 has the capability to calculate more accurate estimates of the incremental positions along the path between starting and ending points using a post-processing step by applying an acceleration correction (i.e., offset) during the re-computation of the path. This involves re-running the second-order numerical integration of the collected acceleration data modified by the correction values (one value for each of the x, y, and z axes).

In the IMU-based loop-closure technique, the awareness of the known starting and ending locations was provided by the user. In accordance with the image-based loop-closure technique proposed herein, that information (i.e., the fact that the sensor is at the same location where it was at the start) can be provided in an automated way to the loop-closure process without human involvement by using scan image data (stored as a scan image) as the reference. The scan image data is captured and stored as the 1-D sensor array is moved, and when new data comes in, an image processing method (such as a Iterative Closest Point technique) continuously compares the most recent scan image to prior scan images to determine if the 1-D sensor array has been there before. If the computer system determines that a minimum set of features in the starting scan image match the equivalent features in the ending scan image, then the computer system adopts and stores the starting and ending positions and uses that information to compute more accurate estimates of the coordinates of the intermediate positions (between the starting and ending locations) of a point on the 1-D sensor array relative to the frame of reference of the target object. The same technique is also applied to the orientation information to produce better estimates of the intermediate orientations of the 1-D sensor array between the starting and ending orientations. One possible implementation would involve applying linearly increasing location corrections at equally spaced intermediate locations, the first (smallest) location correction being applied to the intermediate location closest to the starting location and the last (largest) location correction being applied to the intermediate location closest to the ending location.

The position of the 1-D sensor array relative to the starting position can be determined by using the motion propagation methods described herein. This type of motion propagation is a first-order numerical integration technique (sometimes referred to as dead reckoning). This method—along with the scan image data used to determine when the 1-D sensor array has returned to the starting location (as described above)—provides the necessary information to correct position drift between the starting and ending locations to provide better position and orientation estimates at intermediate locations.

Figure 12:
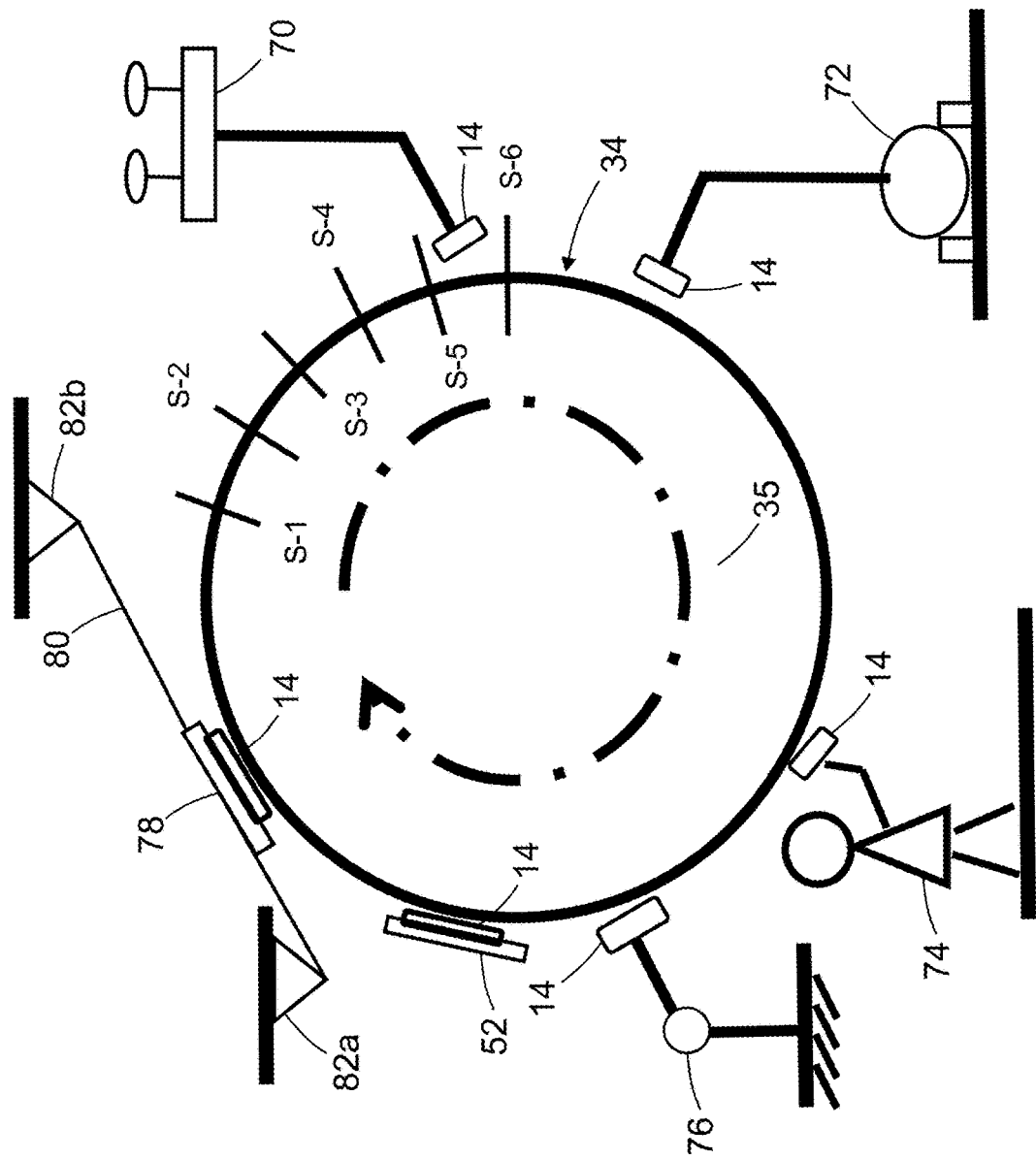
FIG. 12 is a diagram representing a sectional view of an aircraft fuselage skin. The diagram shows a variety of devices which may be utilized to non-destructively inspect the aircraft fuselage from external vantage points using one or more of the innovative image processing techniques proposed herein.

FIG. 12 is a diagram representing a sectional view of an aircraft fuselage skin 35 having a circular cross section. The locations of a plurality of circumferentially distributed stringers S-1 through S-6 are indicated by radial line segments intersecting aircraft fuselage skin 35. The diagram shows a variety of NDI scanner-equipped motion platforms which may be utilized to non-destructively inspect portions of the aircraft fuselage skin 35 from external vantage points using one or more of the innovative image processing techniques proposed herein. In particular, chemically milled pockets (not shown in FIG. 12, but see FIG. 13) disposed the stringers may be inspected using depth and intensity filtering and a loop-closure technique.

Each of the motion platforms depicted in FIG. 12 may be equipped with an NDI scanner 14 that includes a single 1-D sensor array or a pair of mutually parallel 1-D sensor arrays. The NDI scanner-equipped devices depicted in FIG. 12 include a UAV 70, a ground-based robotic motion platform 72, an articulated arm 76, a crawler vehicle 52, and a trolley 78 that is suspended from a cable 80 connected between anchor points 82a and 82b. In accordance with an alternative embodiment, a hand-held NDI scanner 14 may be moved along a loop path by a technician 74.

Figure 13:
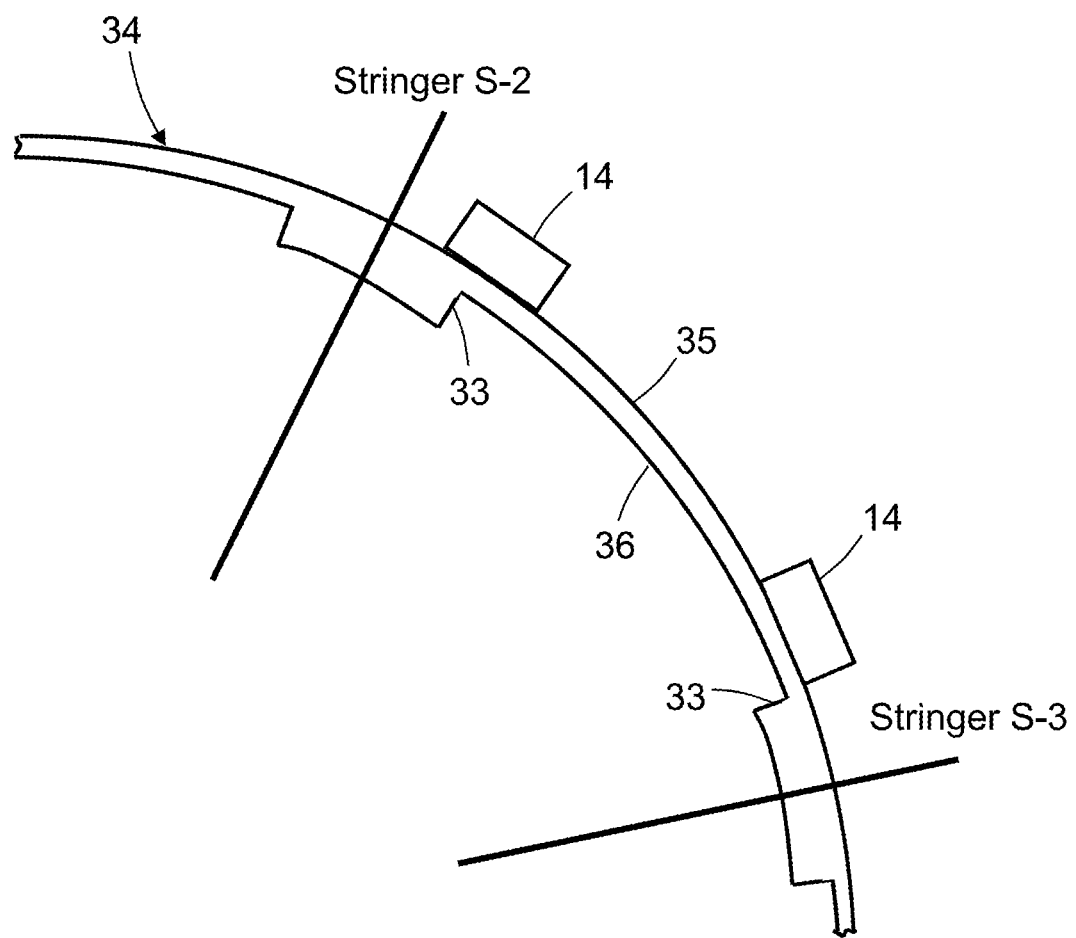
FIG. 13 is a diagram representing a sectional view of a portion of an aircraft fuselage in which respective edges (e.g., chemically milled edges) of a skin are undergoing external NDI.

FIG. 13 is a diagram representing a sectional view of a portion of an aircraft fuselage 34 in which respective portions of an edge 33 of a chemically milled pocket 36 are scanned (at different times) by an NDI scanner 14 that travels along a loop path. The edge 33 is detected using density and intensity filtering. The motion of NDI scanner 14 is then controlled to follow the detected edge 33.

In accordance with some embodiments, crawler vehicles capable of holonomic motion may be used to carry the NDI scanner 14. A holonomic-motion crawler vehicle is capable of moving in a manner such that a point on a 1-D sensor array follows a specific path. More specifically, a holonomic motion system is one that is not subject to motion constraints and can translate in any direction while simultaneously rotating. The holonomic-motion crawler vehicle is configured to move on horizontal surfaces and climb vertical surfaces. This combination of capabilities can be achieved by using a suction generation system that equalizes or evenly distributes the normal loads on Mecanum wheels so that the lateral forces needed by the wheels can be generated. The motion of the resulting platform can be controlled to enable general-purpose positioning for precise motion control of the position of the 1-D sensor array. In alternative embodiments, omni wheels can be employed in place of Mecanum wheels and the surface attraction capability of the crawler vehicle may be based on magnetic or electrostatic sources of attraction instead of suction.

Figure 14:
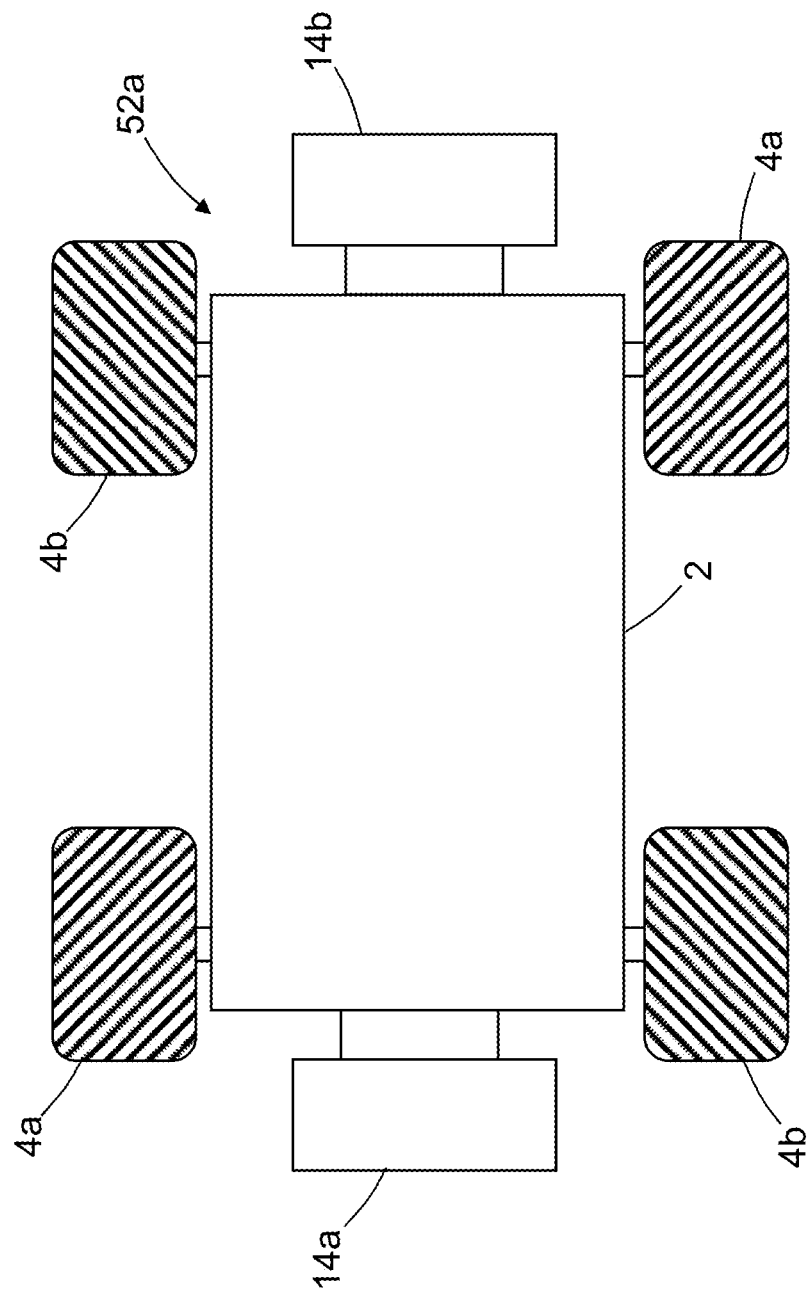
FIG. 14 is a diagram representing a bottom view of a holonomic motion platform having a wheeled frame with a pair of 1-D sensor arrays fixedly mounted (affixed) to and respectively positioned forward and rearward of the frame.
Figure 15:
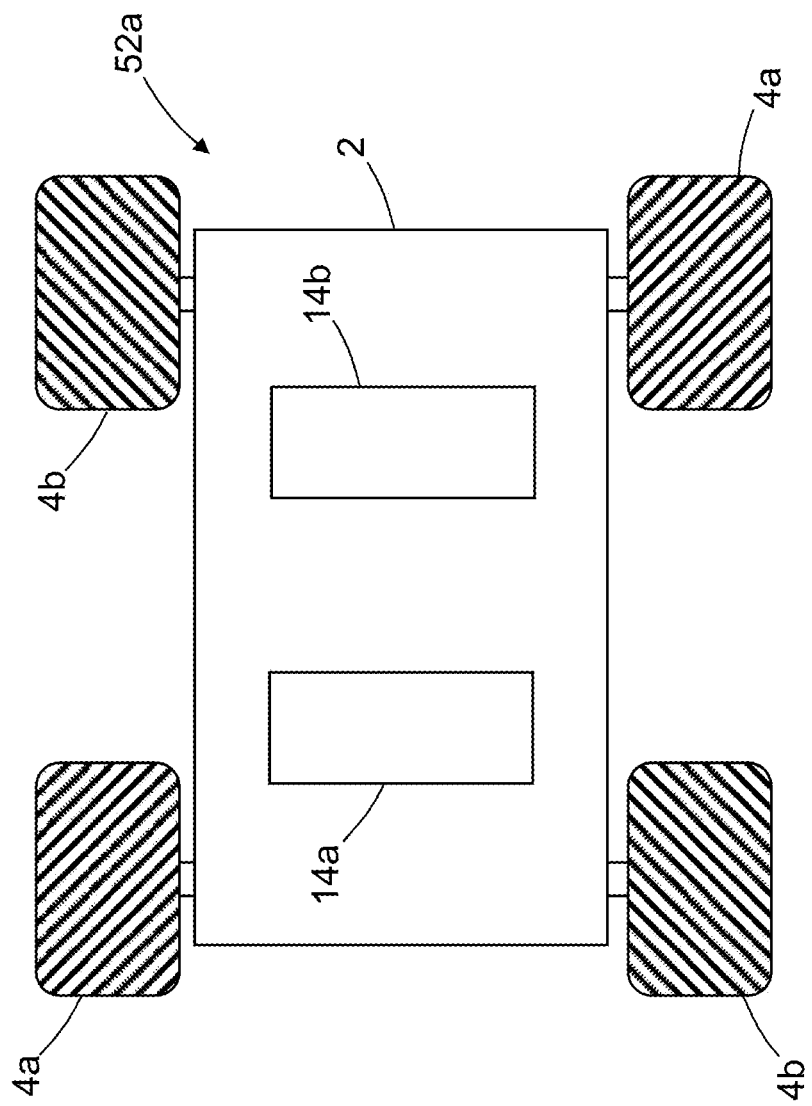
FIG. 15 is a diagram representing a bottom view of a holonomic motion platform having a wheeled frame with a pair of 1-D sensor arrays fixedly mounted (affixed) to and positioned underneath the frame.

FIGS. 14 and 15 are diagrams representing respective bottom views of a holonomic-motion crawler vehicle 52a having a pair of NDI scanners 14a and 14b (e.g., mutually parallel 1-D sensor arrays) fixedly mounted (affixed) to a frame 2. The holonomic-motion crawler vehicle 52a further includes a pair of Type A Mecanum wheels 4a and a pair of Type B Mecanum wheels 4b which are rotatably coupled to frame 2. The Mecanum wheels enable holonomic motion in a well-known manner that is described in U.S. Pat. No. 8,738,226. In the embodiment shown in FIG. 14, the 1-D NDI scanners 14a and 14b are respectively affixed to the front and rear ends of the frame 2. In the embodiment shown in FIG. 15, the 1-D NDI scanners 14a and 14b are respectively mounted underneath frame 2 or in respective openings formed in frame 2.

In accordance with other embodiments, crawler vehicles which are not capable of holonomic motion may be used to carry the NDI scanner 14. In accordance with one proposed implementation, the non-holonomic-motion crawler vehicle includes turret-mounted sensors. The turret is driven to rotate by a turret motor. A computer system coordinates operation of the turret motor with operation of the motors which drive rotation of the wheels as the crawler vehicle is turned using differential steering. The capability of rotating the turret during scanning enables the sensor array to follow a curved path while maintaining the orientation of the sensor array orthogonal to the loop path. (A turret would be redundant on the holonomic-motion crawler vehicle 52a, which already has the capability to precisely control position and orientation simultaneously.)

Figure 16:
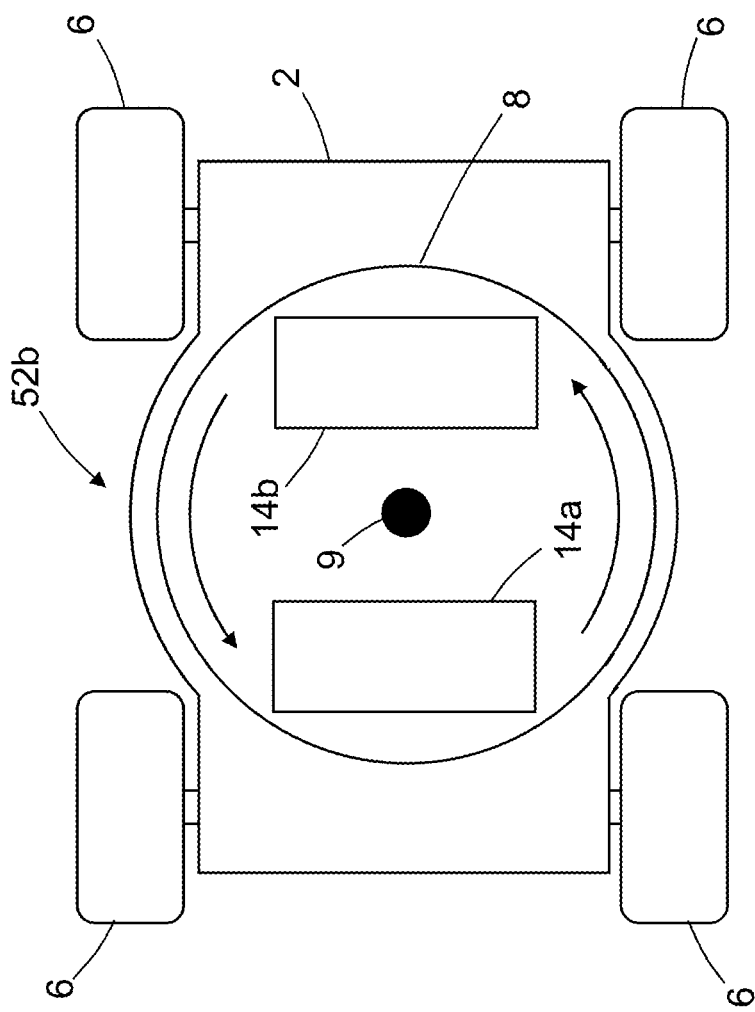
FIG. 16 is a diagram representing a bottom view of a non-holonomic motion platform having a wheeled frame with a pair of 1-D sensor arrays fixedly mounted (affixed) to and positioned underneath a turret which is rotatably coupled to the frame.

FIG. 16 is a diagram representing a bottom view of a non-holonomic-motion crawler vehicle 52b having a pair of mutually parallel 1-D NDI scanners 14a and 14b fixedly mounted (affixed) to a turret 8. The turret 8 is rotatably coupled to the frame 2 in a location such that the turret 8 overlies the surface of the structure being inspected. The non-holonomic-motion crawler vehicle 52b further includes a set of four motorized standard wheels 6 which are rotatably coupled to frame 2. The 1-D NDI scanners 14a and 14b are respectively mounted underneath turret 8 or in respective openings formed in turret 8. The turret 8 enables enhanced corner maneuvering by the 1-D NDI scanners 14a and 14b as the non-holonomic-motion crawler vehicle 52b follows a loop path.

Figure 17:
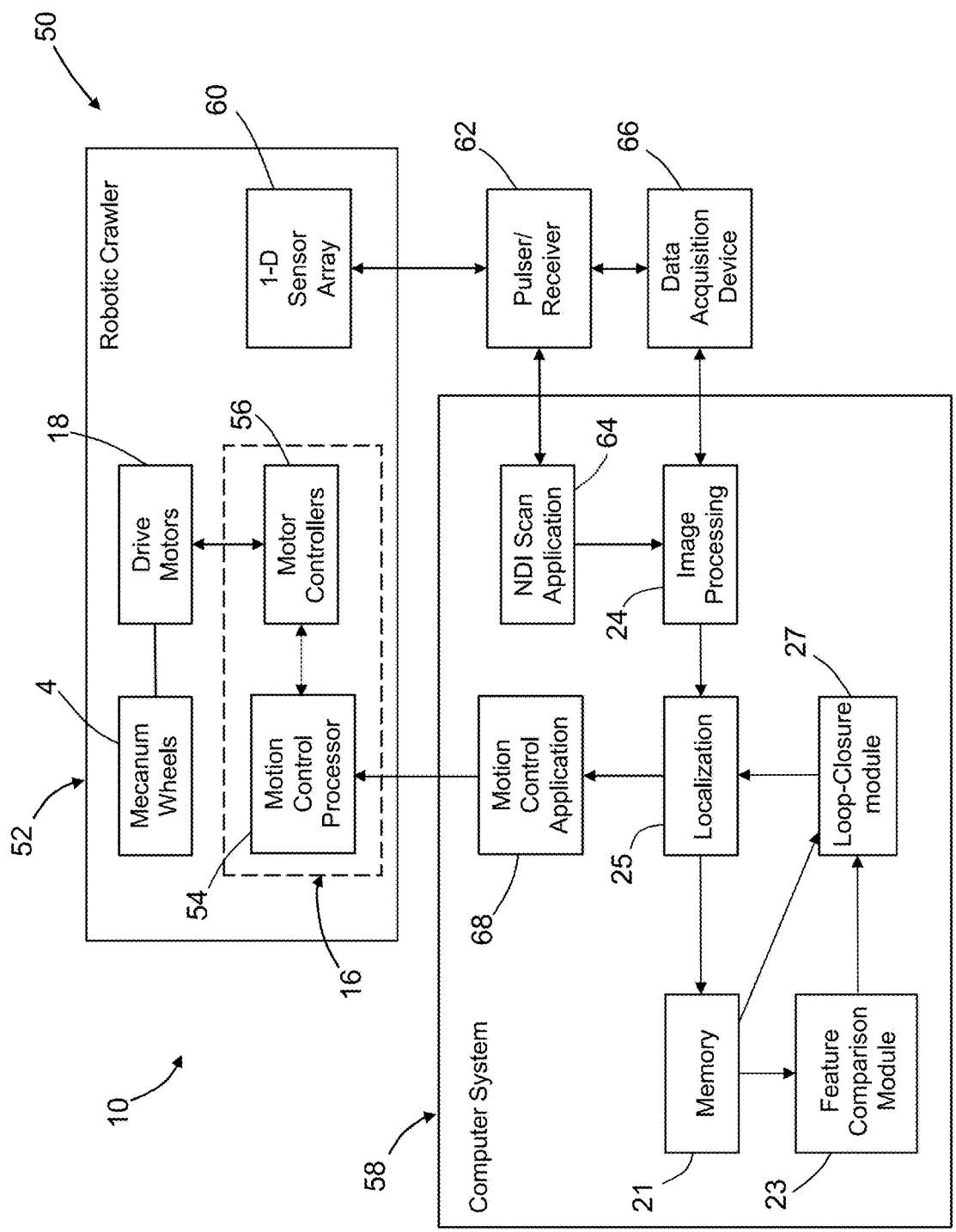
FIG. 17 is a block diagram identifying some components of a system that includes a 1-D sensor array mounted to a robotic crawler vehicle and a computer system configured to control the scanning position of the 1-D sensor array based on images acquired by the 1-D sensor array.

FIG. 17 is a block diagram identifying some components of a system 50 that includes a 1-D sensor array 60 mounted to a Mecanum-wheeled robotic crawler vehicle 52 (hereinafter "crawler vehicle 52") in accordance with one embodiment. The system 50 further includes a computer system 58 configured to control the scanning position of the 1-D sensor array 60 and the acquisition of sensor data by the 1-D sensor array 60. The scanning position is controlled based on common features in scan images derived from the sensor data acquired by the 1-D sensor array 60 from the target object, as previously described herein. The computer system 58 is further configured to correct the recorded data identifying intermediate locations of the 1-D sensor array during a scan loop based on scan images constructed from the sensor data.

As depicted in FIG. 17, the crawler vehicle 52 includes a platform motion controller 16 and a multiplicity of Mecanum wheels 4 operatively coupled to respective drive motors 18. The platform motion controller 16 includes a motion control processor 54 and a multiplicity of motor controllers 56 for independently controlling the drive motors 18 in accordance with control signals received from the motion control processor 54. The motion control processor 54 in turn receives commands from the computer system 58. The computer system 58 may be communicatively coupled to the motion control processor 54 via an electrical cable or wirelessly via transceivers (neither of which are shown in FIG. 17). The computer system 58 uses relative location information to track the relative location (e.g., relative to an initial absolute location acquired using an external position measurement system) of the crawler vehicle 52.

More specifically, the computer system 58 is programmed with NDI scan application software 64 and motion control application software 68. The computer system 58 may comprise a general-purpose computer. The NDI scan application software 64 is configured to control a pulser/receiver 62. In accordance with the architecture depicted in FIG. 17, the pulser/receiver 62 is coupled to provide power and control signals and receive sensor data signals from the 1-D sensor array 60. The pulser/receiver 62 sends pulses to and receives return signals from the 1-D sensor array 60. The NDI scan application software 64 running on computer system 58 controls all details of the image scan data and the display of that data. For example, the 1-D sensor array 60 and pulser/receiver 62 may respectively be a 1-D ultrasonic transducer array and an ultrasonic pulser/receiver unit.

The system 10 further includes a data acquisition device 66 which receives sensor data from the pulser/receiver 62 and converts that sensor data into a format which is acceptable to the image processing and feature point comparison module 24 of computer system 58. The image processing and feature point comparison module 24 (described in detail above) outputs relative location data 26 (see FIG. 1) to a localization module 25. The localization module 25 is configured to convert the relative location data 26 into absolute location data that is useful to the motion control application 68. The motion control application 68 is configured to control the motion of the crawler vehicle 52 to continue to follow the original pre-defined (planned) scan path based on the localization updates received from the localization module 25. In accordance with one embodiment, the motion control application software 68 is configured to control the position of the crawler vehicle 52 in accordance with absolute coordinates output by the localization module 25.

While displays like LCD monitors have fixed pixel spacing, when an NDI scan image is created using a 1-D sensor array, the computer system 58 is configured to determine how far the NDI sensor elements of the 1-D sensor array were from each other when the data was acquired. The spacing between the individual sensor elements of the linear array is known, since those are a fixed distance in the array housing, but from one capture of an array's worth of data to the next, the computer system 58 is configured to accurately space the data, which can be done if the velocity of the motion platform and capture rate of the NDI scanner are known. For example assume the motion platform (and the array) is moving from left to right, and the 1-D sensor array 60 is oriented perpendicular to the left-right direction, which results in an up-down configuration for the array. The individual NDI element (pixel) spacing is known in the up-down direction, but until the left-right velocity is known, the computer system is unable to determine the width of the pixel column spacing. If the motion platform were moving slowly, the left-right spacing would be smaller than if the motion platform were moving fast. In the event that the X spacing and Y spacing are unequal, the scan image may be represented using one of the following options: (1) accept an image that is not scaled equally in X and Y; or (2) insert space in the scan image between the columns of pixels; or (3) stretch or compress the pixels (making them rectangular instead of square).

The computer system 58 identified in FIG. 17 further includes a feature comparison module 23 and a loop-closure module 27. The feature comparison module 23, which compares features between images, comprises digital depth and intensity filters which enable detection of features which, being disposed at known locations, are used as navigation landmarks. The loop-closure module 27 is code configured to perform the loop-closure process using scan image data to correct for drift in computed location upon completion of a loop scan. The feature comparison module 23 and loop-closure module 27 both read the stored location data from a computer memory 21 (hereinafter "memory 21"). The memory 21 gets data from the localization module 25. More specifically, memory 21 stores the incremental changes in position and orientation computed during the run-time collection of scan image data, as well as the feature locations (measured in pixels) from the scan images. The feature comparison module 23 is configured to issue a signal that causes the loop-closure module 27 to start in response to detection of scan images indicating at least partially overlapping starting and ending locations of the sensor array.

The result of the loop-closure process is that incremental changes in position and orientation computed during the just completed scanning process will we updated (by the localization module 25) to provide a more accurate absolute location estimate for every point along the path, and that updated data will then be used to provide better path information for processes that use the path information for further analysis—such as more precise localization (in the frame of reference of the target object) of anomalies in the scan image data.

In accordance with the process performed by feature comparison module 23, the scan images respectively acquired when the sensor array is at the starting and ending locations need not match entirely; it is sufficient, to confirm that a match is present, if those scan images overlap only partially. For example, an image can be decomposed into features points that form a pattern, using changes in contrast (such as corners, edges, holes) to define the 2-D points in the pattern, and it is the relative positions of those feature points within one image which are compared to the relative positions of those feature points in the other image. A threshold for the minimum number of matching feature points can be set, and if that value is reached, the algorithm will indicate a match (otherwise, no match). In making the comparison between images, the matching process is rotationally and positionally invariant, meaning the exact pixels do not need to be aligned; it is sufficient that the pattern be the same wherever it is within the image.

Along each loop path, the image processing and feature point comparison module 23 uses the incremental position differences between feature points from one image to the next image to determine the relative motion of the platform between one scan image area and the next. Continuously adding the position and orientation changes to the prior location produces the new location (i.e., motion propagation). This is a type of dead reckoning. In general, dead reckoning by itself is not a robust way to track the exact path of an object or system, since small errors tend to build up over time, causing the overall position and orientation errors to get worse over time. The feature comparison module 23 is able to determine the location offset between the ending location calculated by the dead reckoning method and the known starting location by comparing scan images. From this comparison of the known relative offset of two locations, the overall deviations in position and orientation can determined. With the overall start-to-end deviations known, the algorithm can apply small adjustments to the incremental frame-to-frame motions (measured from feature point distance comparisons) to correct the motion propagation from the dead reckoning process to obtain a more accurate estimate of the path traveled by (i.e., intermediate locations of) the motion platform during any loop scan.

The updated location estimates are used to provide better path information for processes that use the path information for further analysis—such as more precise localization of anomalies in the scan image data. For example, if there is a group of pixels in a scan image that represent an anomaly, it is useful to know the coordinates on the target object associated with those pixels. If a more accurate estimate of the path that the robot (and NDI scanner) actually followed is obtained, then the position of the anomaly on the target object can be more accurately determined.

The localization module 25 computes estimates of position and orientation and then provides that data to other processes that need position and orientation information. One such process is the navigation process and another process is associating the location data with the scan images. For run-time navigation, the location estimate corrections from the loop-closure process are not available as the navigation motion is happening. The path motion has already happened by the time the loop-closure process is run, since it is a post-processing step that happens after the robot returns to the starting location. However, the navigation aspect of the system can still benefit from the feature comparison part of the loop-closure process by making corrections to the final intermediate positions and orientations, but this only happens after the feature comparison process determines that features (more specifically, a "feature pattern") from the starting image have been found in a subsequent image. The first and last images will likely not line up perfectly, but the location offset (position and orientation) between the patterns in the two images can be used by the navigation subsystem for a location correction step.

Figure 18A:
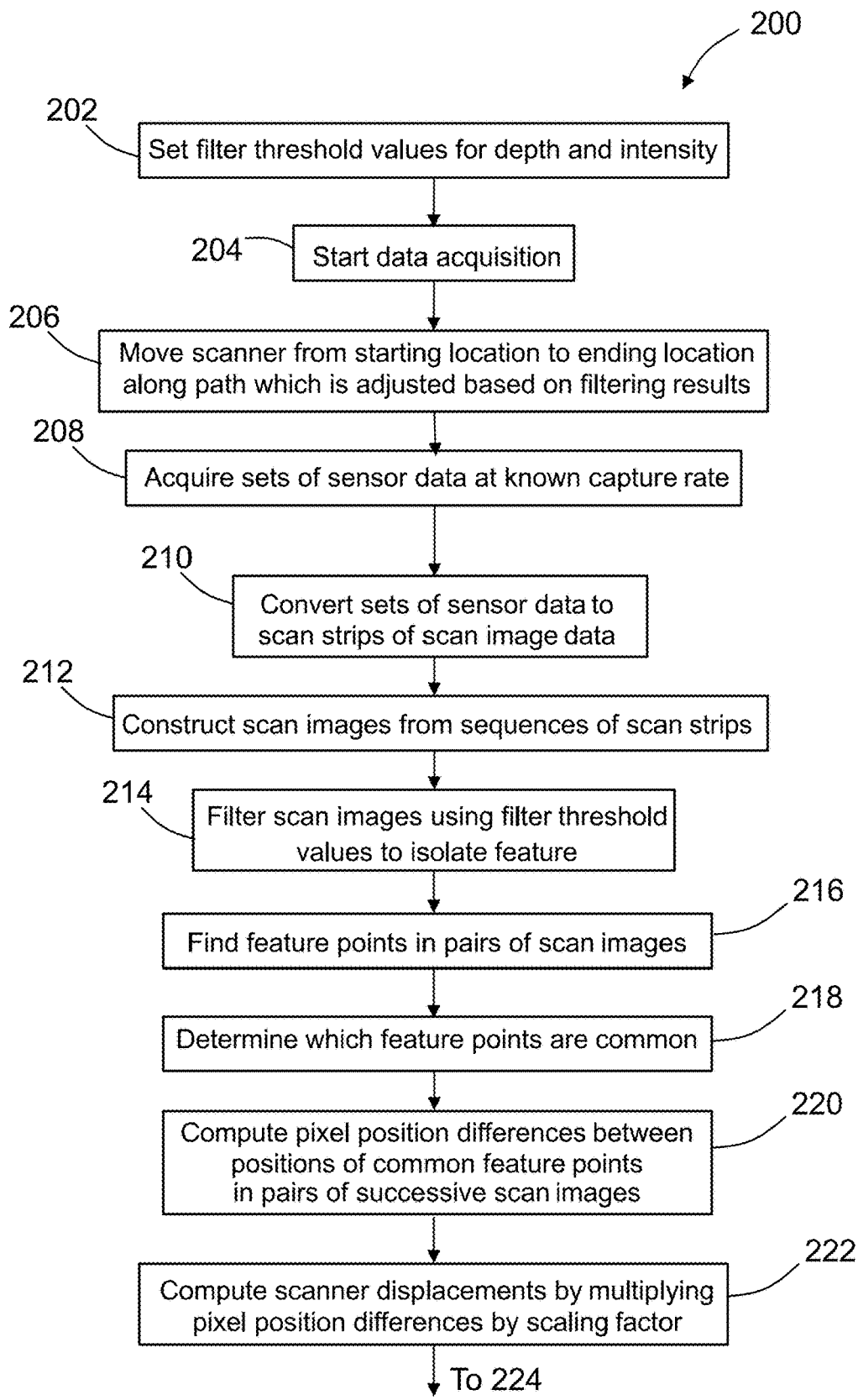
FIGS. 18A and 18B are respective portions of a flowchart identifying steps of a method for tracking a location of an NDI scanner having a 1-D sensor array in a frame of reference of a target object in accordance with one embodiment.
Figure 18B:
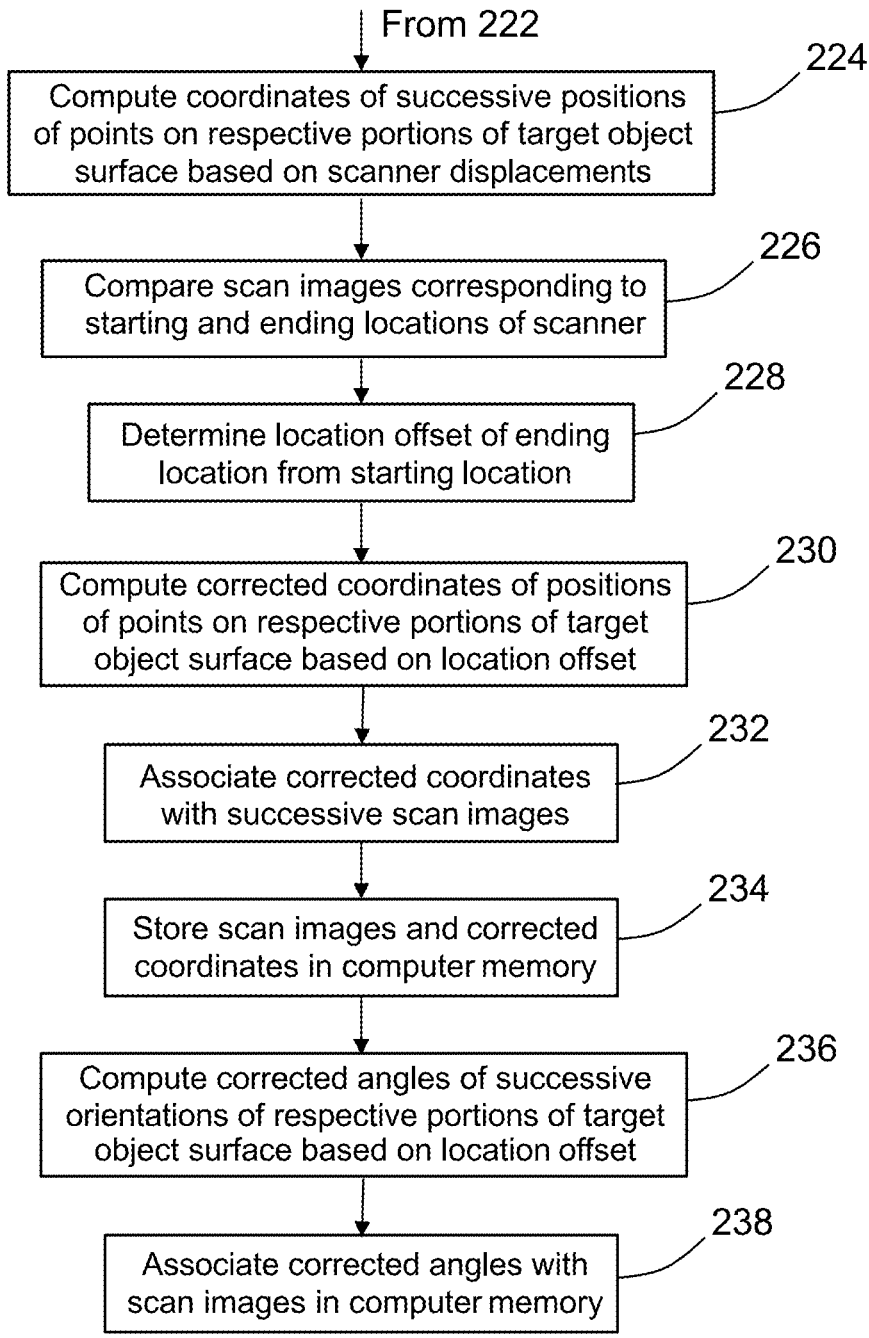

FIGS. 18A and 18B are respective portions of a flowchart identifying steps of a method 200 for tracking a location of an NDI scanner having a 1-D sensor array in a frame of reference of a target object in accordance with one embodiment. The steps identified in FIG. 18B are performed after the steps identified in FIG. 18A as part of post-processing operations performed by the computer system 58.

Referring first to FIG. 18A, filter threshold values for depth and intensity are set prior to the start of scanning (step 202). The pre-set depth and intensity values are associated with a specific type of sub-surface feature in the target object. The NDI scanner 14 is then placed at a starting location on the surface of the target object and data acquisition is started (step 204). Then the NDI scanner 14 is moved across the target object surface from a starting location to an ending location along a path which is adjusted based on filtering results (step 206). Successive sets of sensor data are acquired at a known capture rate as the NDI scanner 14 moves along the path during step 206 (step 208). The successive sets of sensor data are converted to respective scan strips of scan image data (step 210). Then successive scan images are constructed from respective sequences of the scan strips converted from the sensor data acquired as the NDI scanner 14 moves along the path during step 206 (step 212). The successive scan images are then filtered using the filter threshold values to isolate the feature of the specific type (step 214). As previously mentioned, the path along which the NDI scanner 14 moves during step 206 is adjusted based on the filtering results. After filtering, the computer system 58 finds feature points in respective pairs of successive scan images (step 216). The computer system 58 then determines which feature points found in step 216 are common feature points in the respective pairs of successive scan images (step 218). Next the computer system 58 computes pixel position differences between respective positions of common feature points in the respective pairs of successive scan images (step 220). Then the computer system 58 computes respective scanner displacements by multiplying the respective pixel position differences computed in step 220 by a scaling factor representing a distance traveled by the scanner per scan strip (step 222). Next the computer system 58 computes coordinates of successive positions of points on respective portions of the surface of the target object corresponding to the successive scan images based on the respective scanner displacements (step 224).

Referring now to FIG. 18B, the computer system 58 compares respective scan images corresponding to the start and ending locations of the scanner at the start of post-processing operations (step 226). Then the computer system 58 determines a location offset of the ending location from the starting location, which location offset includes a position offset and an orientation offset (step 228). The computer system 58 then computes corrected coordinates of successive positions of points on the respective portions of the surface of the target object corresponding to successive scan images based on the position offset (step 230) and associates the corrected coordinates with the successive scan images (step 232). The successive scan images and associated corrected coordinates are stored in a computer memory or other non-transitory tangible computer-readable storage medium (step 234). In addition, the computer system 58 computes corrected angles of successive orientations of the respective portions of the surface of the target object corresponding to the successive scan images based on the location offset (step 236) and associates the corrected angles with the successive scan images stored in the computer memory (step 238).

In accordance with the teachings herein, corrections can be made to the relative motion measurements by acquiring accurate, absolute measurements at lower update rates. This absolute measurement process (performed while the motion platform is stopped) can be integrated into a relative motion measurement system running at higher update rates, which acquires relative motion measurements while the motion platform is moving. In accordance with one embodiment disclosed hereinafter, a lower-update-rate local positioning system-based process provides corrections to a higher-update-rate localization process.

In addition to mapping subsurface features, the absolute position measurements may be used to map the location of surface and subsurface anomalies in the target object. The mapping of the defect size, shape, and depth to a CAD model of the target object will enable further analysis of the defect in the structure, analysis of its effects on structural performance, and repair analysis and planning.

In accordance with one proposed implementation, the 1-D sensor array takes the form of an array of ultrasonic transducer elements configured to enable the production and display of a scan of a small area. Many different ultrasonic transducer element configurations can be employed. For example, the ultrasonic transducer array may comprise an array of transmit/receive electrodes arranged in rows and columns in a pixel-type configuration. In an alternative configuration, the ultrasonic transducer array comprises a set of mutually parallel elongated transmit electrodes which overlap and cross a set of mutually parallel elongated receive electrodes at a non-zero angle. An ultrasonic transducer array can be used to inspect any number of structures in a variety of industries where detection of flaws or anomalies in the structure is required, such as in the aircraft, automotive, marine, or construction industries. The ultrasonic transducer array is capable of detecting any number of flaws or anomalies within or on the surface of the structure, such as impact damage (e.g., delaminations and matrix cracking), disbonds (e.g., airframe/reinforcing members or honeycomb composites), discontinuities, voids, or porosity, which could adversely affect the performance of the structure.

The enhanced motion platform navigation control process disclosed herein solves the problem of navigation and localization of non-destructive examination/inspection (NDE/NDI) when features in the structural configuration area of interest are hidden (far side) from the observer and when precise path navigation is required. The process provides real-time feedback to the motion control system (or operator) during the scanning process, as well as post-scanning data correction.

The proposed process will eliminate manual preplanning activities required to establish a closed-loop path for scanning of the hidden features and reduce the fatigue and workload of the technician to plan a path to navigate the loop and monitor NDE/NDI detection signals.

The systems and method disclosed herein may be used to automate in-service structural inspection of aircraft as part of maintenance, repair, and overhaul activities. For example, manual and tedious inspection of chemically milled pockets and lap joints may be automated. However, there are many other types of structures that could benefit from the technology disclosed herein. For example, the systems and method disclosed herein may be used to detect migrating window seals, defective lap splices, missing sealant in butt joints, and cracks.

The concepts disclosed herein are applicable to many types of automated motion platforms, including robotic crawlers as well as unmanned aerial vehicles. The concept may also be applied to manually moved platforms.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for tracking the location of an NDI scanner using scan images of the target object have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore, it is intended that the claims set forth hereinafter not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit. For example, the image processor 15, platform motion controller 16 and NDI sensor data processor 20 identified in FIG. 1 form a "computer system" as defined herein.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A method for tracking a location of a scanner having a one-dimensional sensor array in a frame of reference of a target object, the method comprising:
    (a) placing the scanner adjacent a surface of the target object at a known location that is defined in a coordinate system of the target object;
    (b) translating the scanner at a known speed in a direction which is parallel to an axis of the coordinate system;
    (c) acquiring successive sets of sensor data at a known sampling rate as the scanner translates during step (b) using the one-dimensional sensor array;
    (d) converting the successive sets of sensor data to respective scan strips of scan image data;
    (e) constructing a first scan image from a first sequence of scan strips converted from sensor data acquired during movement of the one-dimensional sensor array in the direction from a first position to a third position;
    (f) constructing a second scan image from a second sequence of scan strips converted from sensor data acquired during movement of the 1-D sensor array in the direction from a second position to a fourth position, wherein the first scan image and the second scan image are filtered to isolate a feature of a specific type, and wherein a path along which the scanner moves is adjusted based on the first scan image and the second scan image as filtered;
    (g) finding feature points in the first and second scan images;
    (h) determining which feature points found in step (g) are common feature points in the first and second scan images;
    (i) computing a pixel position difference between respective positions of a common feature point in the first and second scan images;
    (j) computing a scanner displacement by multiplying the pixel position difference computed in step (i) by a scaling factor representing a distance traveled by the scanner per scan strip; and
    (k) computing a coordinate of a current location of the scanner, defined in the coordinate system of the target object, using the known location and the scanner displacement.

2. The method as recited in claim 1, wherein step (k) comprises computing a relative physical position change of the one-dimensional sensor array based on the known speed, known sampling rate, and difference between respective positions of the common feature point in the first and second scan images.

3. The method as recited in claim 2, wherein the relative physical position change is equal to a distance separating the first and second positions of the scanner in the frame of reference of the target object.

4. The method as recited in claim 1, wherein the second position is between the first and third positions.

5. The method as recited in claim 1, wherein the scanner is fixedly mounted on a motion platform and translating the scanner at a known speed comprises translating the motion platform at the known speed.

6. A method for tracking displacement of a scanner having a one-dimensional sensor array relative to a target object having subsurface structural features, the method comprising:
    (a) placing the scanner adjacent a surface of the target object;
    (b) translating the scanner along the surface of the target object at a known speed in a direction which is perpendicular to the one-dimensional sensor array;
    (c) acquiring successive sets of subsurface depth sensor data at a known sampling rate as the scanner translates in the direction during step (b) using the one-dimensional sensor array;
    (d) converting the successive sets of subsurface depth sensor data to respective scan strips of scan image data;
    (e) constructing a first scan image from a first sequence of scan strips converted from subsurface depth sensor data acquired during movement of the one-dimensional sensor array in the direction from a first position to a third position;
    (f) constructing a second scan image from a second sequence of scan strips converted from subsurface depth sensor data acquired during movement of the 1-D sensor array in the direction from a second position to a fourth position, wherein the first scan image and the second scan image are filtered to isolate a feature of a specific type, and wherein a path along which the scanner moves is adjusted based on the first scan image and the second scan image as filtered;

(g) finding feature points of subsurface structural features in the first and second scan images;

(h) determining which feature points found in step (g) are common feature points in the first and second scan images;

(i) computing a pixel position difference between respective positions of a common feature point in the first and second scan images; and (j) computing a scanner displacement by multiplying the pixel position difference computed in step (i) by a scaling factor representing a distance traveled by the scanner per scan strip.

7. The method as recited in claim 6, wherein step (k) comprises computing a relative physical position change of the one-dimensional sensor array based on the known speed, known sampling rate, and difference between respective positions of the common feature point in the first and second scan images.

8. The method as recited in claim 7, wherein the relative physical position change is equal to a distance separating the first and second positions.

9. The method as recited in claim 6, wherein the second position is between the first and third positions.

10. The method as recited in claim 6, wherein the scanner is fixedly mounted on a motion platform and translating the scanner at a known speed comprises translating the motion platform at the speed.

11. A method for tracking displacement of a scanner having first and second one-dimensional sensor arrays, which are mutually parallel and separated by a fixed distance, relative to a target object having subsurface structural features, the method comprising:

(a) placing the scanner adjacent a surface of the target object;

(b) translating the scanner along the surface of the target object from a first position to a second position at a known speed and in a direction which is perpendicular to the first and second one-dimensional sensor arrays;

(c) acquiring first and second successive sets of subsurface depth sensor data at a known sampling rate as the scanner translates from the first position to the second position during step (b) using the first and second one-dimensional sensor arrays respectively;

(d) converting the first and second successive sets of subsurface depth sensor data to first and second sequences of scan strips of scan image data;

(e) constructing a first scan image from the first sequence of scan strips;

(f) constructing a second scan image from the second sequence of scan strips, wherein the first scan image and the second scan image are filtered to isolate a feature of a specific type, and wherein a path along which the scanner moves is adjusted based on the first scan image and the second scan image as filtered;

(g) finding feature points of subsurface structural features in the first and second scan images;

(h) determining which feature points found in step (g) are common feature points in the first and second scan images;

(i) computing a pixel position difference between respective positions of a common feature point in the first and second scan images; and (j) computing a scanner displacement by multiplying the pixel position difference computed in step (i) by a scaling factor representing a distance traveled by the scanner per scan strip.

12. The method as recited in claim 11, wherein step (k) comprises computing a relative physical position change of the one-dimensional sensor array based on the known speed, known sampling rate, and difference between respective positions of the common feature point in the first and second scan images.

13. The method as recited in claim 12, wherein the relative physical position change is equal to a distance separating the first and second positions.

14. The method as recited in claim 11, wherein the second position is between the first and third positions.

15. The method as recited in claim 11, wherein the scanner is fixedly mounted on a motion platform and translating the scanner at a known speed comprises translating the motion platform at the known speed.

16. A system comprising:

a motorized motion platform comprising a frame;

first and second one-dimensional sensor arrays which are affixed to the frame of the motion platform and have centerlines which are oriented mutually parallel and separated by a fixed distance; and a computer system communicatively coupled to receive subsurface depth sensor data from the first and second one-dimensional sensor arrays and send control signals for controlling movement of the motorized motion platform, the computer system being configured to perform operations comprising:

(a) controlling the motorized motion platform to translate the first and second one-dimensional sensor arrays along the surface of the target object at a known speed and in a direction which is perpendicular to the first and second one-dimensional sensor arrays;

(b) operating the first one-dimensional sensor array to acquire first successive sets of subsurface depth sensor data at a known sampling rate as the motorized motion platform translates from a first position to a second position during step (a) using the first and second one-dimensional sensor arrays respectively;

(c) converting the first and second successive sets of subsurface depth sensor data to first and second sequences of scan strips of scan image data;

(d) constructing a first scan image from the first sequence of scan strips;

(e) constructing a second scan image from the second sequence of scan strips, wherein the first scan image and the second scan image are filtered to isolate a feature of a specific type, and wherein a path along which the motorized motion platform moves is adjusted based on the first scan image and the second scan image as filtered;

(f) finding feature points of subsurface structural features in the first and second scan images;

(g) determining which feature points found in step (f) are common feature points in the first and second scan images;

(h) computing a pixel position difference between respective positions of a common feature point in the first and second scan images; and (i) computing a platform displacement by multiplying the pixel position difference computed in step (h) by a scaling factor representing a distance traveled by the motorized motion platform per scan strip.

17. The system as recited in claim 16, wherein the computer system is further configured to compute a coordinate of a current location of the motorized motion platform, defined in a coordinate system of the target object, using the first position and the platform displacement.

18. The system as recited in claim 16, wherein the motorized motion platform further comprises:
   a plurality of Mecanum wheels rotatably coupled to the frame; and
   a plurality of motors mounted to the frame and respectively operatively coupled to respective Mecanum wheels of the plurality of Mecanum wheels.

19. The system as recited in claim 16, wherein:
   the motorized motion platform further comprises a turret rotatably coupled to the frame; and
   the first and second one-dimensional sensor arrays are mounted to the turret.

20. The system as recited in claim 16, wherein the first one-dimensional sensor array comprises a first row of ultrasonic transducers and the second one-dimensional sensor array comprises a second row of ultrasonic transducers.

21. The system as recited in claim 16, wherein the first one-dimensional sensor array comprises a first row of eddy current coils and the second one-dimensional sensor array comprises a second row of eddy current coils.

* * * * *